United States Patent [19]

Ghavam et al.

[11] Patent Number: 5,771,045
[45] Date of Patent: Jun. 23, 1998

[54] METHOD FOR POLYGON DECOMPOSITION

[75] Inventors: Karen M. Ghavam; Ross Cunniff, both of Ft. Collins, Colo.

[73] Assignee: Hewlett-Packard Company, Palo Alto, Calif.

[21] Appl. No.: 546,647

[22] Filed: Oct. 23, 1995

[51] Int. Cl.⁶ .................................................. G06T 17/20
[52] U.S. Cl. ............................................................. 345/423
[58] Field of Search .................................... 395/133, 134, 395/141, 123; 435/423, 433, 441, 434

[56] References Cited

U.S. PATENT DOCUMENTS

| | | | |
|---|---|---|---|
| 5,043,711 | 8/1991 | Harrington | 395/441 X |
| 5,129,051 | 7/1992 | Cain | 395/433 |
| 5,133,049 | 7/1992 | Cain et al. | 395/423 |
| 5,317,681 | 5/1994 | Glassner | 395/441 |
| 5,428,717 | 6/1995 | Glassner | 395/423 |
| 5,553,206 | 9/1996 | Meshkat | 395/423 |
| 5,623,790 | 4/1997 | Lalvani | 52/81.2 |

OTHER PUBLICATIONS

Chiang et al., Time–Efficient VLSI Artwork Analysis Algorithms in GOALIE2, IEEE Transactions on Computer–Aided Design, v.8,n.6,pp. 640–648, Jun. 1989.
Nagesawara, Robot Navigation in Unknown Generalized Polygonal Terrains Using Vision Sensors, IEEE Transactions on Systems, Man, and Cybernetics, v.25,n.6,pp. 947–962, Jun. 1995.
Chi, A Method For Net Representation With Polygon Decomposition, IEEE, pp. 222–225, May 1988.
"Multi–dimensional Searching and Computational Geometry" by Kurt Mehlhorn; EATCS Monographs on Theoretical Computer Science; Springer–Verlag 1984; pp. 79–83.
"Triangulating Simple Polygons and Equivalent Problems" by Alain Fournier and Delfin Y. Montuno; ACM Transactions on Graphics, vol. 3, No. 2, Apr. 1984, pp. 153–174.
"A Fast Las Vegas Algorithm For Triangulating a Simple Polygon" by Kenneth L. Clarkson et al.; Proc. of the 4$^{th}$ Annual ACM Symp. on Computational Geometry, 1988; pp. 18–21.
"The Graham Scan Triangulates Simple Polygons" by Xianshu Kong et al.; Pattern Recognition Letters, 11 (1990); pp. 713–716.
"Fast Triangulation of Simple Polygons" by Stefan Hertel et al.; 4$^{th}$ Conf. Foundations of Computation Theory; Springer–Verlag LNCS 158 (1983); pp. 207–218.
"Triangulating a Polygon in Parallel" by Michael T. Goodrich; Journal of Algorithms, 10 (1989); pp. 327–351.
"Triangulation and Shape–Complexity" by Bernard Chazelle et al.; ACM Transactions on Graphics, vol. 3, No. 2, Apr. 1984; pp. 135–152.
"Triangulating a Simple Polygon in Linear Time" by Bernard Chazelle; Discrete Computer Geometry 6 (1991); pp. 485–524.
"Decomposing a Polygon Into Its Convex Parts" by Bernard Chazelle et al.; Proceedings of the 11$^{th}$ ACM Symposium on Theory of Computing; Atlanta, GA. 1979; pp. 38–48.

(List continued on next page.)

*Primary Examiner*—Anton Fetting

[57] ABSTRACT

A method for decomposing a polygon into trapezoids and further decomposing the trapezoids. During the decomposition process, the method classifies vertices having a horizontal edge by traversing the active trapezoid list, and using the trapezoids found in the list to aid in classifying the vertex. When a polygon fully contains another polygon, the method slits a diagonal between the outside polygon and the inside polygon to create a single polygon. During the slitting produces, vertices are duplicated and diagonals connecting to the original vertex are left connected to the original vertex or are connected to the duplicated vertex. The method corrects improper ordering of the inside polygon, and the method provides consistency checks during the decomposition process to detect polygons with intersecting edges.

23 Claims, 17 Drawing Sheets

OTHER PUBLICATIONS

"A Linear–Time Algorithm for Triangulating Simple Polygons" by Robert E. Tarjan et al.; Proc. 18$^{th}$ Annual ACM Symposium on Theory of Computing, 1986; pp. 380–388.

"An O(n log log n)–Time Algorithm For Triangulating A Simple Polygon" by Robert E. Tarjan et al.; SIAM Journal of Comput. 17 (1988); pp. 143–178.

"Decomposition of Polygons Into Simpler Components: Feature Generation For Syntactic Pattern Recognition" by Hou–Yuan F. Feng et al.; IEEE Trans. on Computers, vol. C–24, No. 6, Jun. 1975; pp. 636–650.

"Decomposition of Polygons Into convex Sets" by Bruce Schachter; IEEE Trans. Computers C–72(11); Nov. 1978; pp. 1078–1082.

"The Decomposition of Polygons Into Convex Parts" by Daniel H. Greene; In Adv. Comput. Res., F.P. Preparata, ed., JAI Press Inc. (1983); pp. 235–259.

"On Partitioning Polygons" by Andrsej Lingas; In Proc. 1$^{st}$ Annual ACM Symposium Comput. Geom. (1985). pp. 288–295.

1.15. Preparate, F.P. An Optimal Real Time Algorithm for Planar Convex Hulls. Commun. ACM 22 (1979), pp. 402–405.

"A Linear Time Algorithm For Triangulating A Point–Visible Polygon" by T.C. Woo et al.; ACM Trans. on Graphics, 4 (1985); pp. 60–69.

"Convex Decomposition of Simple Polygons" by S.B. Tor et al.; ACM Trans. on Graphics, vol. 3, No. 4, Oct. 1984; pp. 244–265.

"An Optimal Algorithm For Finding The Kernel Of A Polygon" by D.T. Lee et al.; Journal of the Association for Computing Machinery, vol. 26, No. 3; Jul. 1979; pp. 415–421.

"Two Algorithms for Constructing A Delaunay Triangulation" by D.T. Lee et al.; International Journal of Computer and Information Sciences, vol. 9, No. 3, 1980; pp. 219–242.

"Some NP–Hard Polygon Decomposition Problems" by Joseph O'Rourke et al.; IEEE Transactions on Information Theory, vol. IT–29, No. 2; Mar. 1983; pp. 181–190.

"Polygon Decomposition And Switching Function Minimization" by J. O'Rourke; Computer Graphics And Image Processing 18; (1982); pp. 382–391.

"A Theorem On Polygon Cutting With Applications" by Bernard Chazelle; 23$^{rd}$ Annual Symposium on Foundations of Computer Science; 1982; pp. 339–349.

"Minimum Decompositions of Polygonal Objects" by J.M. Keil et al.; In Computational Geometry, G.T. Toussaint, ed., North–Holland (1985); pp. 197–212.

"On Finding the Convex Hull of a Simple Polygon" by D.T. Lee; International Journal of Computer and Information Sciences, vol. 12, No. 2; 1983; pp. 87–98.

"Decomposing a Polygon into Simpler Components" by J.M. Keil; SIAM Journal of Comput. 14 (1985); pp. 799–817.

"Triangulation of Planar Regions with Applications" by B.A. Lewis et al.; Computer Journal, vol. 21, No. 4; Nov. 1978; pp. 324–332.

"A Heuristic Triangulation Algorithm" by David A. Plaistad et al.; Journal of Algorithms 8 (1987); pp. 405–437.

"Partitioning a Polygonal Region into a Minimum Number of Triangles" by Tetsuo Asano et al.; Trans. IECE Japan E67 (1984), pp. 232–233.

"Closest–Point Problems" by M.I. Shamos et al.; Proc. IEEE Symp. on Foundations of Computer Science 16; (1975); pp. 151–162.

"The Art Gallery Theorem for Polygons with Holes" by F. Hoffman et al.; Proc. 32$^{nd}$ Annual Symposium on Foundations of Computer Science; Publisher: IEEE Computer Science Press, Oct. 1991; pp. 39–48.

"A Fast Convex Hull Algorithm" by Selim G. Akl et al.; Information Processing Letters, 7 (1970); pp. 219–222.

"Triangulating a Simple Polygon" by Michael R. Garey et al.; Information Processing Letters, 7 (1978); pp. 175–179.

"Another Efficient Algorithm for Convex Hulls in Two Dimensions" by A.M. Andrew; Information Processing Letters, 9 (1979); pp. 216–219.

"Convex Hull of a Finite Set of Points in Two Dimensions" by A. Bykat; Information Processing Letters, 7 (1978); pp. 296–298.

"Finding the Convex Hull of a Simple Polygon" by Ronald L. Graham et al.; Journal of Algorithms. To Be Published.

"A Linear Algorithm for Finding the Convex Hull of a Simple Polygon" by Duncan McCallum et al.; Information Processing Letters, 9 (1979); pp. 201–205.

"Traditional Galleries Require Fewer Watchmen" by J. Kahn et al.; SIAM Journal of Algebraic and Discrete Methods, vol. 4, No. 2; 1983; pp. 194–206.

"A Non–Hamiltonian, Nondegenerate Delaunay Triangulation" by M.B. Dillencourt; Information Processing Letters, 25 (1987); pp. 149–151.

"Traveling Salesman Cycles are Not Always Subgraphs of Delaunay Triangulations or of Minimum Weight Triangulations" by M.B. Dillencourt; Information Processing Letters, 24 (1987); pp. 339–342.

METHOD FOR POLYGON DECOMPOSITION

FIELD OF THE INVENTION

This invention relates to a computer systems and more particularly to graphics displays within such computer systems. Even more particularly, the invention relates to a method for decomposing polygons into simpler shapes within such graphics displays.

BACKGROUND OF THE INVENTION

In computational geometry, many useful methods have been developed for decomposing objects into simpler elements. Decomposing an object into simpler elements allows simpler processing of the object by processing each of the simpler elements separately. Another reason for decomposing into simpler elements is that processing speed can be improved if the object can be decomposed into elements simple enough for processing directly by graphics hardware.

One method for decomposing polygons into trapezoids is shown in "Triangulating Simple Polygons and Equivalent Problems" by Alain Fournier and Delfin Y. Montuno, ACM Transactions on Graphics, Vol. 3, No. 2, April 1984, Pages 153–174 (hereinafter "the Fournier article"). The Fournier article described decomposing polygons into trapezoids and describes further decomposing the trapezoids into triangles, as well as dealing with holes in the polygon. A hole occurs when a smaller polygon is contained within a larger polygon. However, the Fournier article fails to describe classifying a vertex having a horizontal edge connected to it, and the Fournier article also fails to describe processing of diagonals entering or leaving vertices duplicated during the process of removing holes. Also, the method described in the Fournier article assumes the polygon is not intersecting, and thus deals inadequately with polygons having intersecting edges.

There is a need in the art then for a method of decomposing a polygon into trapezoids, and further into triangles, wherein the method processed vertices having a horizontal edge. There is a further need for such a method that processes diagonals entering or leaving vertices that have been duplicated during the process of removing holes. A still further need is for such a method that recognizes that a polygon has intersecting edges and cannot be further processed using the method. The present invention meets these and other needs in the art.

SUMMARY OF THE INVENTION

It is an aspect of the present invention to decompose a polygon into a plurality of triangles.

It is another aspect of the invention to classify each vertex during the decomposition, and to classify the vertex when horizontal edges are present based on the state of the active trapezoid list.

Another aspect is to reorder polygon edges of holes within a polygon to ensure that the hole ordering is opposite that of the outside polygon.

A further aspect is to remove holes within polygons by duplicating vertices and reconnecting diagonals entering and leaving those vertices.

A still further aspect is to recognize a polygon with intersecting edges and discontinue processing the polygon.

The above and other aspects of the invention are accomplished in a computer implemented method that decomposes a polygon into trapezoids and further decomposes the trapezoids into triangles. During the decomposition process, the method classifies vertices having a horizontal edge by traversing the active trapezoid list, and using the trapezoids found in the list to aid in classifying the vertex.

When a polygon fully contains another polygon, the method slits a diagonal between the outside polygon and the inside polygon to create a single polygon. During this process, some vertices are duplicated and diagonals connecting to the original vertex are left connected to the original vertex, or reconnected to the duplicated vertex, in order to form a single polygon.

The ordering of the vertices of the inside polygon are reversed if the method finds that the original ordering prevents correct operation.

The method further provides consistency checks during the decomposition process to detect polygons with intersecting edges.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
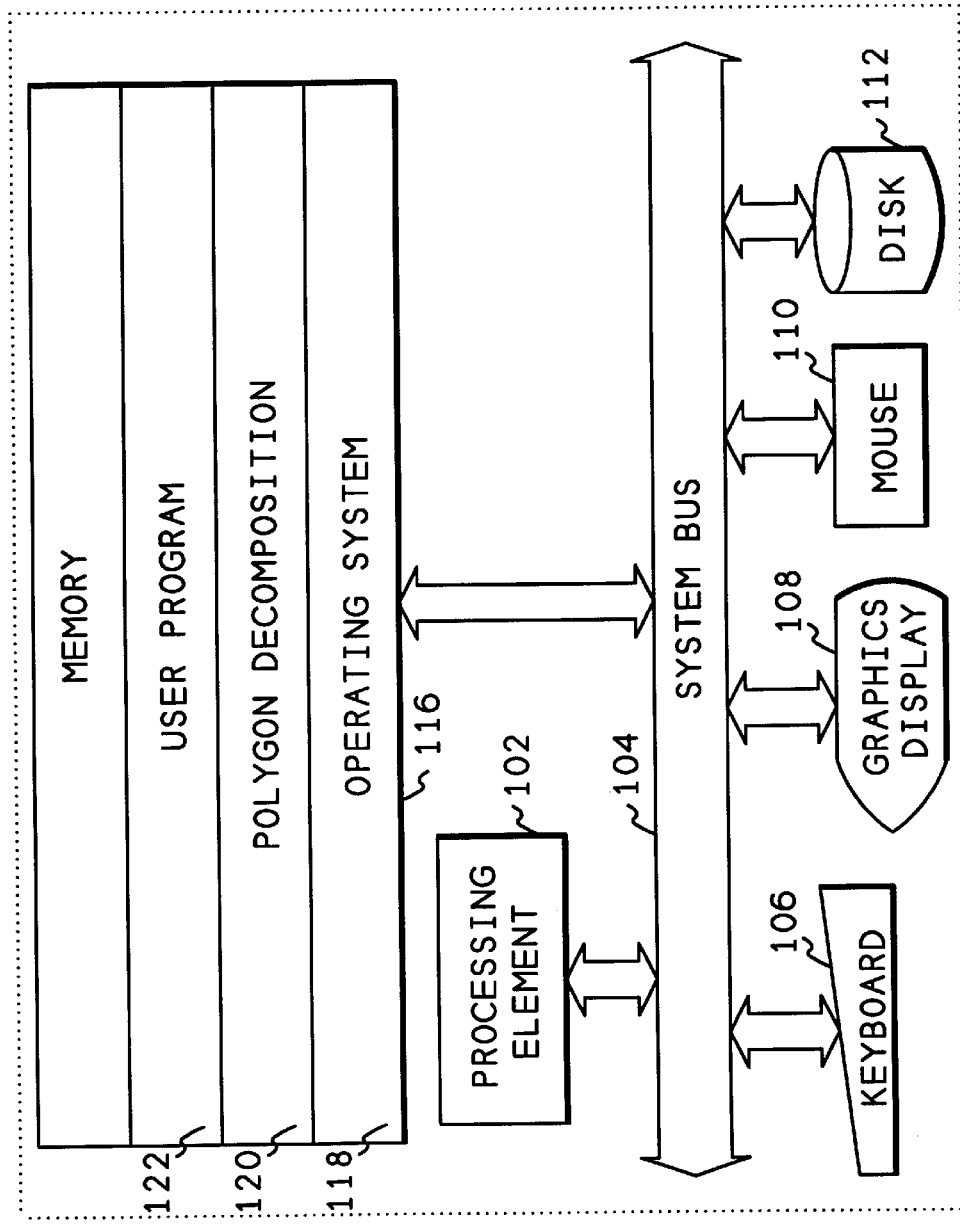
FIG. 1 shows a block diagram of a computer system containing the present invention.

FIG. 1 shows a block diagram of a computer system incorporating the present invention. Referring now to FIG. 1, a computer system 100 contains a processing element 102 which communicates to other elements of the computer system 100 over a system bus 104. A keyboard 106 and a mouse 110 allow input to the computer system 100 and a graphics display 108 allows software within the computer system 100 to output information to a user of the computer system 100. A disk 112 stores the software and data of the present invention as used within the computer system 100.

A memory 116 contains an operating system 118, which may be any one of a number of popular operating systems such as the Unix Operating System, etc. A user program 122 calls the polygon decomposition software 120 of the present invention.

The present invention is a method for decomposing a polygon into a plurality of trapezoids, which are further decomposed into triangles. Once decomposed into triangles, the figures can easily be filled when displayed onto a graphics display device. The overall process is to sort the vertices for the polygon into a top to bottom, left to right order. These vertices are then processed in this sorted order to create diagonals across the polygon, thus, to identify "trapezoids" in the polygon. From these diagonals that have been created, the polygon is then broken into unimonotone polygons and then the unimonotone polygons are triangulated to produce triangles for display.

A trapezoid is identified within the system as having a left edge, a right edge, a start vertex, and an end vertex. The left and right edges are identified by their start and end vertices, typically called vertex 0 of the edge and vertex 1 of the edge, respectively. The start vertex is the vertex at which the trapezoid definition began, and the end vertex is placed into the trapezoid definition when the trapezoid is completed. A trapezoid is considered active so long as its ending vertex has not yet been identified.

The term trapezoid is used not to identify the classic mathematical definition of a trapezoid, but instead it identifies a y-range slab of the polygon between two successive y values within the polygon. Trapezoid is the closest known figure to what most often is created during the decomposition process, thus the term trapezoid is used for these figures.

The purpose of performing the decomposition of the polygon into the trapezoids is to define diagonals along the polygon which will allow the method to further break the polygon into unimonotone pieces which can then be easily triangulated. Within the definition of the trapezoids described below, a diagonal will be created whenever there is a trapezoid with a start vertex and an end vertex that are not adjacent on the same edge, within the original polygon vertex list.

The unimonotone polygon is defined where there is a single edge connecting two points within the polygon and these two points have the maximum and minimum y-coordinates of the polygon.

Vertices within the polygon are classified into one of three types. The first type is where the edges leading from the vertex are both below a horizontal line passing through the point. This type is called a start/split vertex. The second type of vertex, called a continue vertex, occurs where one of the edges leading from the vertex is above the horizontal line passing through the vertex and one edge is below this horizontal line. The third type of vertex, called an end/join vertex occurs when both edges leading from the vertex are above the horizontal line that passes through the point. A special case occurs when one of the edges leading from the vertex is located on a horizontal line, and processing of these types of vertices will be described below.

Figure 2:
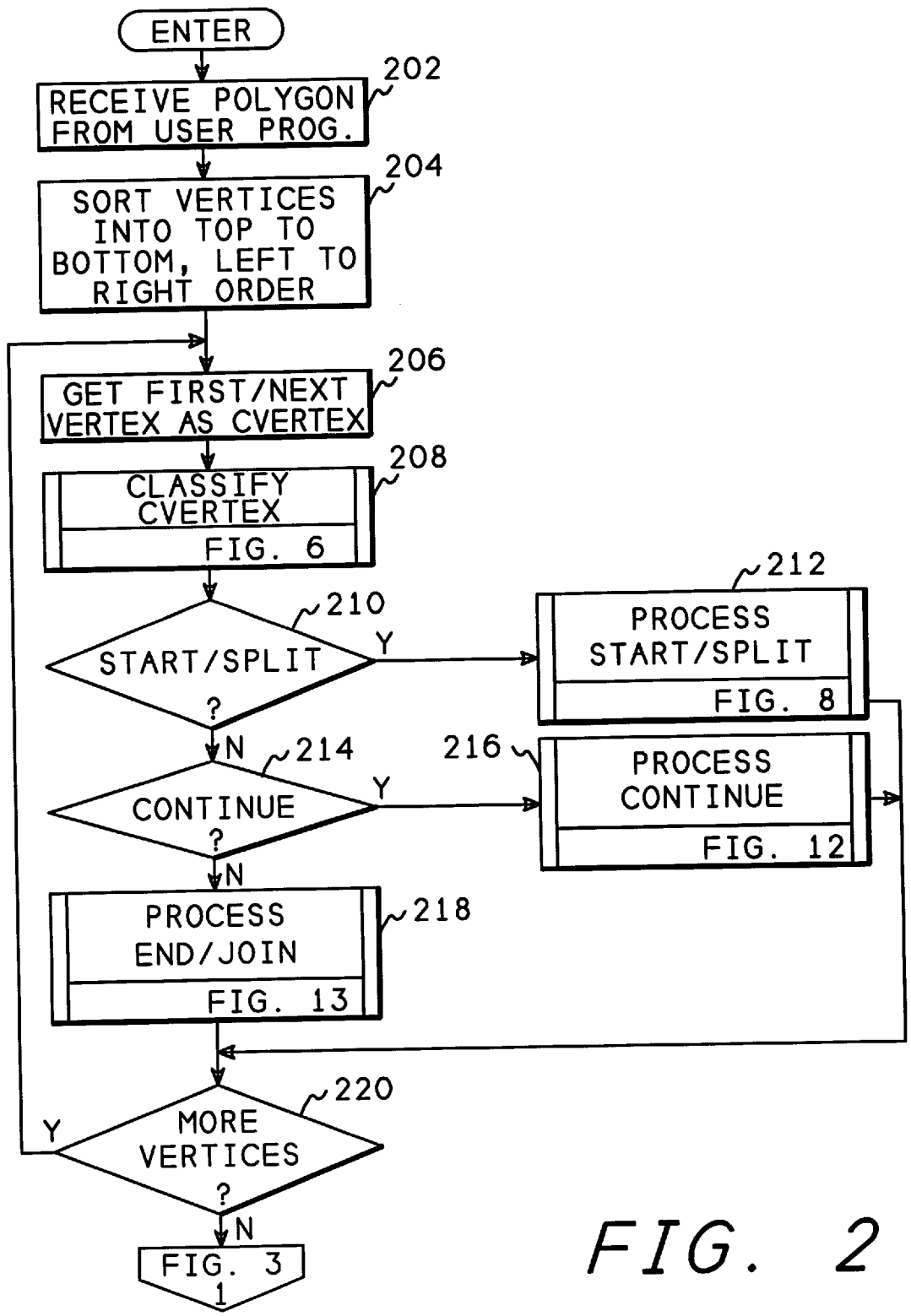
FIGS. 2 and 3 show a flowchart of the top level of processing within the present invention.
Figure 3:
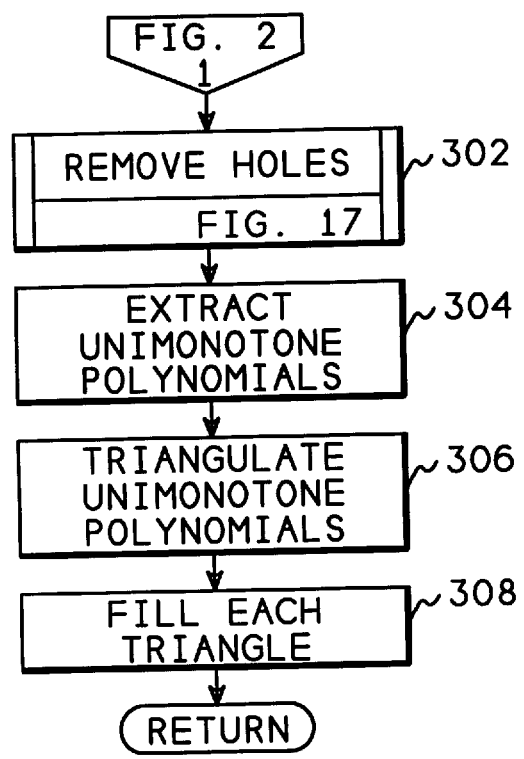

FIGS. 2 and 3 provide a high level flowchart of the process of the present invention. Referring now to FIGS. 2 and 3, after entry, block 202 receives the polygon definition from the user program. Block 204 then sorts the vertices of the polygon into a top to bottom, left to right order.

Block 206 then gets the first or next vertex from the sorted list and identifies this by the label CVERTEX. Block 208 calls FIG. 6 to classify CVERTEX into one of the three vertices described above—start/split, continue, or end/join.

Figure 8:
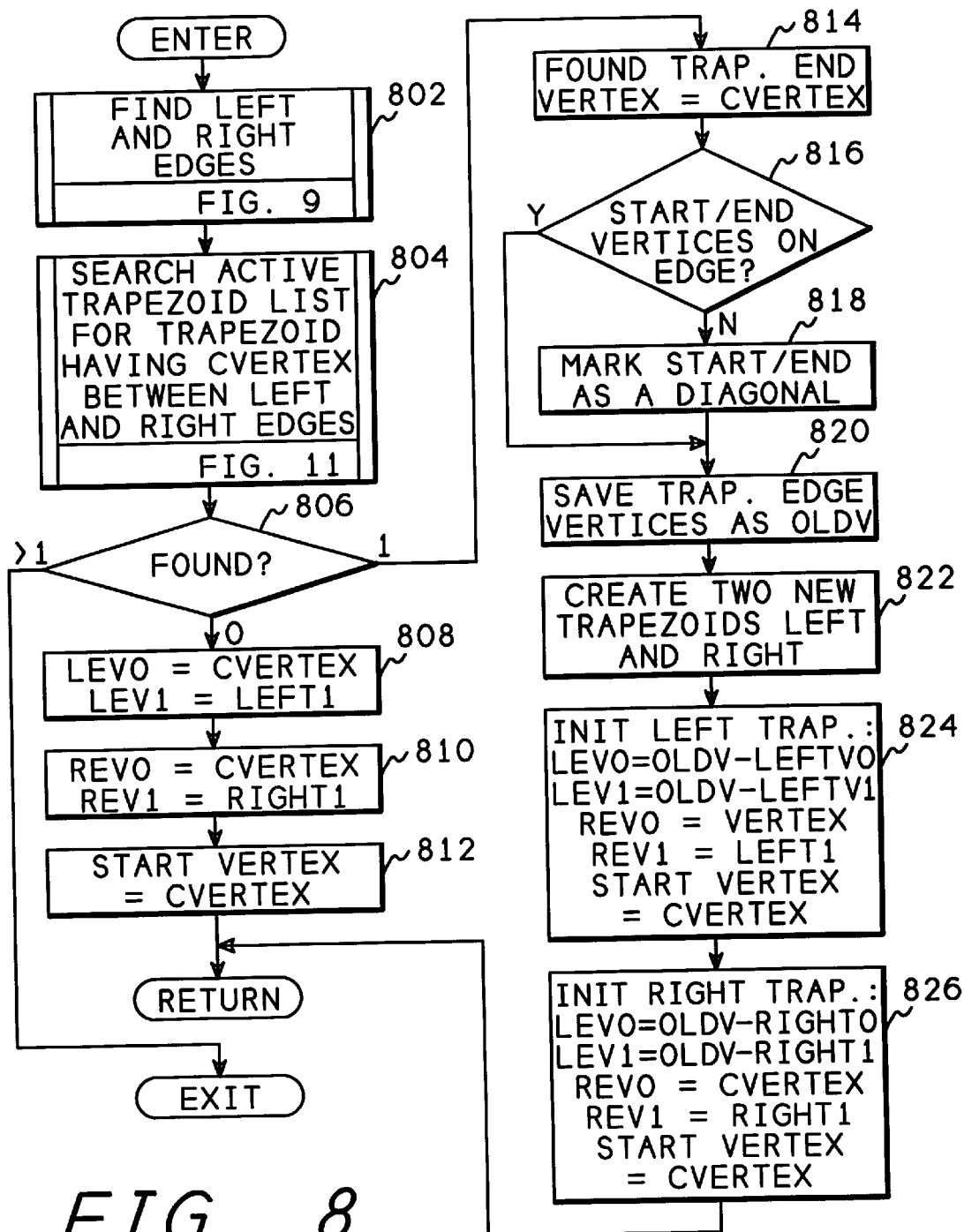
FIG. 8 shows a flowchart of the method for processing a start/split vertex as called from FIG. 2.

If the vertex is a start/split vertex, block 210 transfers to block 212 which calls FIG. 8 to process the vertex. If the vertex is a continue vertex, block 214 transfers to block 216 which calls FIG. 12 to process the continue vertex, otherwise, block 218 calls FIG. 13 to process the end/join vertex. After the vertex is processed, control goes to block 220 which determines whether there are more vertices in the list, and if so, block 220 transfers back to back to block 206 to get the next vertex. After all vertices within the polygon have been processed, block 220 transfers to block 302 (FIG. 3) which calls the process of FIG. 17 to remove any holes within the polygon. That is, the polygon may have a smaller polygon contained within it, and this smaller polygon represents a hole within the larger polygon.

After the holes have been removed, block 304 extracts the unimonotone polygons from the diagonals created in the above process. Extracting unimonotone polygons is well known in the art, and is specifically described in the Fournier article, starting on page 158.

After the unimonotone polygons have been extracted, block 304 triangulates the unimonotone polygons. This process is also well known, as described in the Fournier article, starting on page 160. After the triangles have been created, block 308 then fills each triangle, often by calling an imbedded hardware function to perform the fill. After the triangle has been filled, FIG. 3 returns to its caller.

Figure 4:
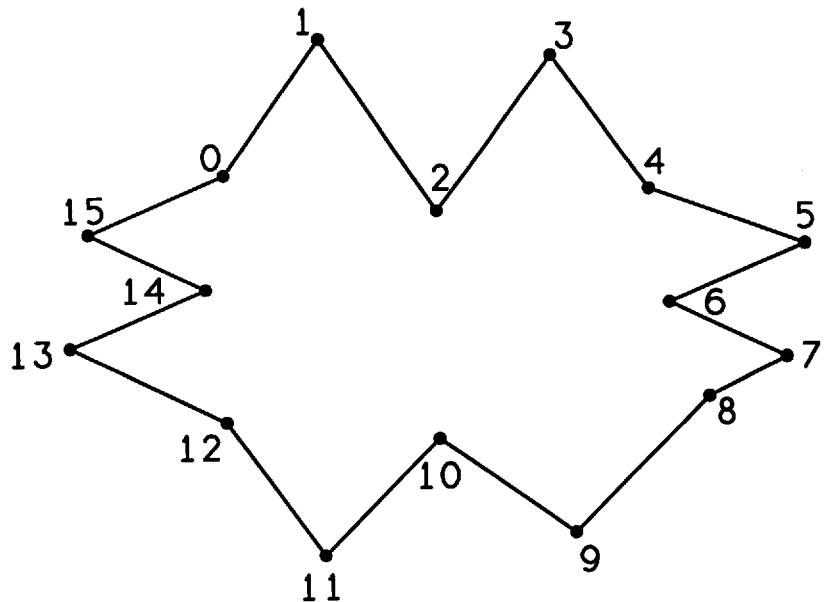
FIG. 4 shows an example polygon to be decomposed by the present invention.
Figure 5:
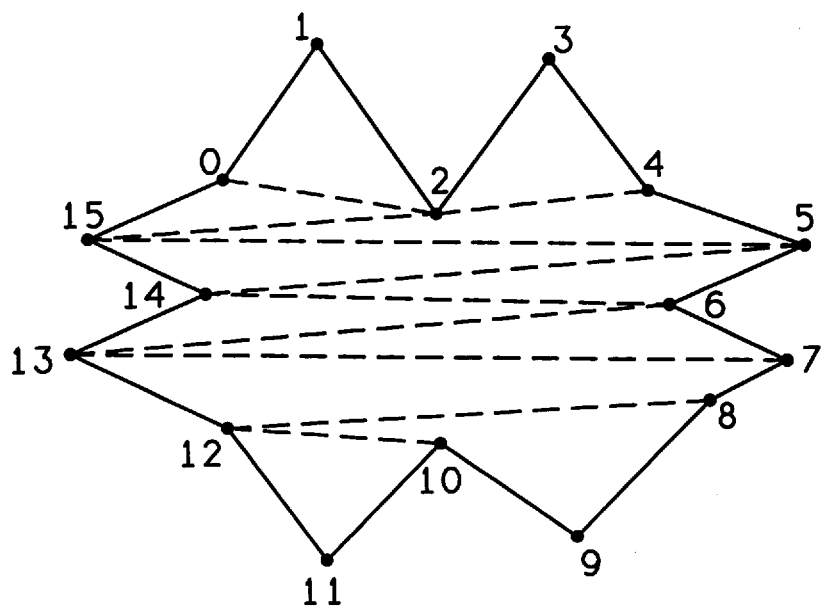
FIG. 5 shows diagonal lines placed on the polygon of FIG. 4 by the present invention.

FIG. 4 shows an example polygon to be diagonalized and triangulated, and FIG. 5 shows the diagonals created by following the process described above with respect to FIG. 2. Before further describing the details of the method, the following example will process the polygon of FIG. 4 to create the diagonals of FIG. 5.

After sorting the vertices, process Vertex 1, since it is the topmost vertex. Vertex 1 is a Start/split type vertex since both edges leading from the vertex are below a horizontal line passing through the vertex. Since this is the first vertex to be processed, obviously the list of trapezoids is empty, so a trapezoid is started in the trapezoid list. Therefore, after processing this vertex, the trapezoid list is:

LE:1,0
RE:1,2
SE:1,?

This notation means that the left edge (LE) of the trapezoid is formed by vertices 1 and 0, the right edge (RE) is formed by vertices 1 and 2, the start vertex is vertex 1, and the end vertex is unknown. Since the end vertex is unknown, as shown by the question mark, the trapezoid is still active. Once the end vertex is found for this trapezoid, the trapezoid will not longer be active.

The next vertex in the top to bottom, left to right order is vertex 3, which is a Start/split type vertex. The search through the trapezoid list reveals that vertex 3 is not in between any of the trapezoid edges currently in the active trapezoid list, so a new trapezoid entry is created in the list. Therefore the trapezoid list becomes:

| | |
|---|---|
| LE:1,0 | LE:3,2 |
| RE:1,2 | RE:3,4 |
| SE:1,? | SE:3,? |

The next vertex in the list is vertex 0, which is a continue type vertex, since one of its edges goes above a horizontal line and one goes below a horizontal line passing through the vertex. Searching the active trapezoid list finds a trapezoid in the active trapezoid list (the first one in the list) that has this vertex as the bottom vertex of one of its edges. Therefore, the system completes that trapezoid and starts a new trapezoid by continuing the trapezoid just found. Therefore, the trapezoid list becomes (note that active trapezoids have a question mark in place of their end vertex, whereas the completed trapezoids have an ending vertex number—the first trapezoid in the list is completed, and the second and third trapezoids are still active):

| | | |
|---|---|---|
| LE:1,0 | LE:3,2 | LE:0,15 |
| RE:1,2 | RE:3,4 | RE:1,2 |
| SE:1,0 | SE:3,? | SE:0,? |

Vertex 4 is next in the list, and it is a continue type vertex. The system searches the list for a trapezoid in the active trapezoid list that has this vertex as the bottom vertex of one of its edges. This search locates the first trapezoid in the active trapezoid list. The system completes that trapezoid and starts a new trapezoid by continuing the trapezoid found. Now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,? |
| LE:3,2 | | |
| RE:4,5 | | |
| SE:4,? | | |

Next is Vertex 2, which is an end/join type vertex. Finding an end/join vertex means that there is one or two trapezoids in the active trapezoid list that have this vertex as the endpoint of one of their edges. The search in the list gives both the first and second trapezoid in the active trapezoid list. So the system completes these two trapezoids, and makes a new trapezoid that is a join of these two trapezoids. So now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,2 |
| LE:3,2 | LE:0,15 | |
| RE:4,5 | RE:4,5 | |
| SE:4,2 | SE:2,? | |

Next is Vertex 15, which is a continue type vertex. The system performs a continue type search, which reveals the one and only active trapezoid in the list. The system completes this trapezoid and starts a new trapezoid. So now the trapezoid list

| | | |
|---|---|---|
| LE:1,0 | LE:3,2 | LE:0,15 |
| LE:1,2 | RE:3,4 | RE:1,2 |
| SE:1,0 | SE:3,4 | SE:0,2 |
| LE:3,2 | LE:0,15 | LE:15,14 |
| RE:4,5 | RE:4,5 | RE:4,5 |
| SE:4,2 | SE:2,15 | SE:15,? |

Next is Vertex 5, which is a continue type vertex. A continue type search reveals the one and only active trapezoid in the list. The system completes this trapezoid and starts a new trapezoid. So now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,2 |
| LE:3,2 | LE:0,15 | LE:15,14 |
| RE:4,5 | RE:4,5 | RE:4,5 |
| SE:4,2 | SE:2,15 | SE:15,5 |
| LE:15,14 | | |
| RE:5,6 | | |
| SE:5,? | | |

Next is Vertex 14, which is a continue type vertex. A continue type search reveals the one and only active trapezoid in the list. The system completes this trapezoid and starts a new trapezoid. So now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,2 |
| LE:3,2 | LE:0,15 | LE:15,14 |
| RE:4,5 | RE:4,5 | RE:4,5 |
| SE:4,2 | SE:2,15 | SE:15,5 |
| LE:15,14 | LE:14,13 | |
| RE:5,6 | RE:5,6 | |
| SE:5,14 | SE:14,? | |

Next is Vertex 6, which is a continue type vertex. A continue type search reveals the one and only active trapezoid in the list. The system completes this trapezoid and starts a new trapezoid. So now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,2 |
| LE:3,2 | LE:0,15 | LE:15,14 |
| RE:4,5 | RE:4,5 | RE:4,5 |
| SE:4,2 | SE:2,15 | SE:15,5 |
| LE:15,14 | LE:14,13 | LE:14,13 |
| RE:5,6 | RE:5,6 | RE:6,7 |
| SE:5,14 | SE:14,6 | SE:6,? |

Next is Vertex 13, which is a continue type vertex. A continue type search reveals the one and only active trapezoid in the list. The system completes this trapezoid and starts a new trapezoid. So now the trapezoid list is:

| | | |
|---|---|---|
| LE:1,0 | LE:3,2 | LE:0,15 |
| RE:1,2 | RE:3,4 | RE:1,2 |
| SE:1,0 | SE:3,4 | SE:0,2 |
| LE:3,2 | LE:0,15 | LE:15,14 |
| RE:4,5 | RE:4,5 | RE:4,5 |
| SE:4,2 | SE:2,15 | SE:15,5 |
| LE:15,14 | LE:14,13 | LE:14,13 |
| RE:5,6 | RE:5,6 | RE:6,7 |
| SE:5,14 | SE:14,6 | SE:6,13 |
| LE:13,12 | | |

-continued

|      |      |
|------|------|
| RE:6,7 |    |
| SE:13,? |   |

Next is Vertex 7, which is a continue type vertex. A continue type search reveals the one and only active trapezoid in the list. The system completes this trapezoid and starts a new trapezoid. So now the trapezoid list is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE:3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:14,13 |
| RE:5,6   | RE:5,6   | RE:6,7   |
| SE:5,14  | SE:14,6  | SE:6,13  |
| LE:13,12 | LE:13,12 |          |
| RE:6,7   | RE:7,8   |          |
| SE:13,7  | SE:7,?   |          |

Next is Vertex 8, which is a continue type vertex. A continue type search reveals the one and only active trapezoid in the list. The system completes this trapezoid and starts a new trapezoid. So now the trapezoid list is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE:3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:14,13 |
| RE:5,6   | RE:5,6   | RE:6,7   |
| SE:5,14  | SE:14,6  | SE:6,13  |
| LE:13,12 | LE:13,12 | LE:13,12 |
| RE:6,7   | RE:7,8   | RE:8,9   |
| SE:13,7  | SE:7,8   | SE:8,?   |

Next is Vertex 12, which is a continue type vertex. A continue type search reveals the one and only active trapezoid in the list. The system completes this trapezoid and starts a new trapezoid. So now the trapezoid list is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE:3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:14,13 |
| RE:5,6   | RE:5,6   | RE:6,7   |
| SE:5,14  | SE:14,6  | SE:6,13  |
| LE:13,12 | LE:13,12 | LE:13,12 |
| RE:6,7   | RE:7,8   | RE:8,9   |
| SE:13,7  | SE:7,8   | SE:8,12  |
| LE:12,11 |          |          |
| RE:8,9   |          |          |
| SE:12,?  |          |          |

Next is Vertex 10, which is a start/split type vertex. The search through the trapezoid list reveals that vertex 10 is in between the edges 12, 11 and 8, 9, which is also the only active trapezoid in the list. The system completes that trapezoid, and begins two new trapezoids. So the trapezoid list at this point is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE:3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:14,13 |
| RE:5,6   | RE:5,6   | RE:6,7   |
| SE:5,14  | SE:14,6  | SE:6,13  |
| LE:13,12 | LE:13,12 | LE:13,12 |
| RE:6,7   | RE:7,8   | RE:8,9   |
| SE:13,7  | SE:7,8   | SE:8,12  |
| LE:12,11 | LE:12,11 | LE:10,9  |
| RE:8,9   | RE:10,11 | RE:8,9   |
| SE:12,10 | SE:10,?  | SE:10,?  |

Next is Vertex 9, which is a end/join vertex type. So there exists either one or two trapezoids in the active trapezoid list with vertex 9 at the bottom of one of their edges. The search reveals that the second active trapezoid is the only trapezoid satisfying this condition. So the system completes this trapezoid. Since this is an end/join vertex type, no new trapezoids are created. So the trapezoid list at this point is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE:3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:4,13  |
| RE:5,6   | RE:5,6   | RE:6,7   |
| SE:5,14  | SE:14,6  | SE:6,13  |
| LE:13,12 | LE:13,12 | LE:13,12 |
| RE:6,7   | RE:7,8   | RE:8,9   |
| SE:13,7  | SE:7,8   | SE:8,12  |
| LE:12,11 | LE:12,11 | LE:10,9  |
| RE:8,9   | RE:10,11 | RE:8,9   |
| SE:12,10 | SE:10,?  | SE:10,9  |

The last vertex is vertex 11, which is an end/join vertex type. The system does the same type of search as in the previous step. The trapezoid list at this point is:

| LE:1,0   | LE:3,2   | LE:0,15  |
|----------|----------|----------|
| RE:1,2   | RE:3,4   | RE:1,2   |
| SE:1,0   | SE:3,4   | SE:0,2   |
| LE.3,2   | LE:0,15  | LE:15,14 |
| RE:4,5   | RE:4,5   | RE:4,5   |
| SE:4,2   | SE:2,15  | SE:15,5  |
| LE:15,14 | LE:14,13 | LE:14,13 |
| RE:5,6   | RE:5,6   | RE:6,7   |
| SE:5,14  | SE:14,6  | SE:6,13  |
| LE:13,12 | LE:13,12 | LE:13,12 |
| RE:6,7   | RE:7,8   | RE:8,9   |
| SE.13,7  | SE:7,8   | SE:8,12  |
| LE:12,11 | LE:12,11 | LE:10,9  |
| RE.8,9   | RE:10,11 | RE:8,9   |
| SE:12,10 | SE:10,11 | SE:10,9  |

At this point the system has processed all of the vertices, and are done with the trapezoidization phase of the decomposition. The trapezoid entries above that are in italics are the trapezoids that found diagonals. FIG. 5. shows the polygon drawn with the diagonals.

Figure 6:
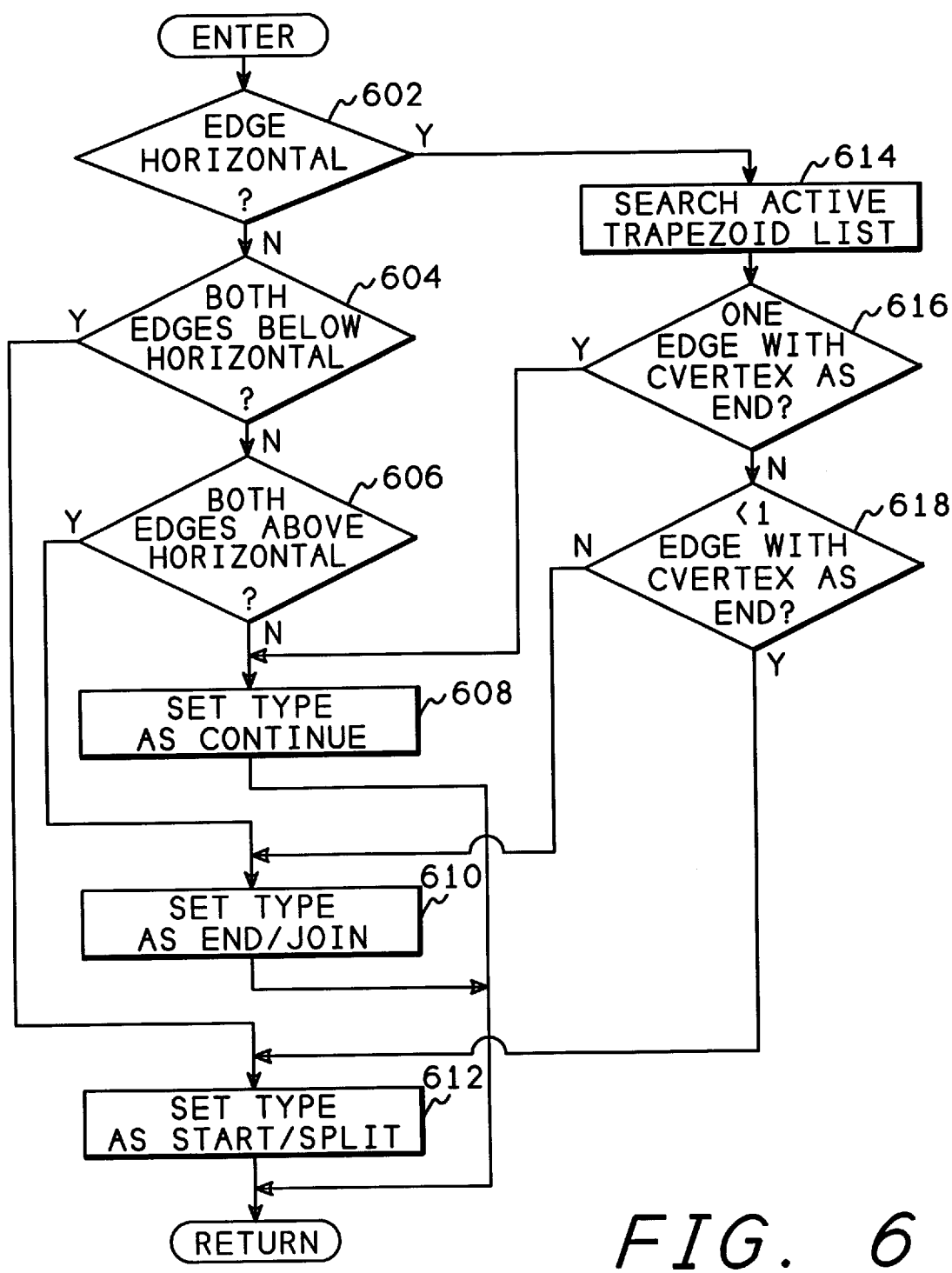
FIG. 6 shows a flowchart of the classify vertex method called from FIG. 2.

FIG. 6 shows a flowchart of the classify vertex method called from FIG. 2. Referring now to FIG. 6, after entry, block 602 determines whether one of the edges connected to the vertex is horizontal. If neither edge is horizontal, block 602 goes to block 604 which determines whether both of the edges connected to the vertex are located below a horizontal line that passes through the vertex. This is easily determined by examining the y-coordinate of the vertices at the other end of the edges and if the y-coordinates for both these "other end" vertices are below the y-coordinate for the vertex, then both edges are below the horizontal line. If so, block 604 goes to block 612 which sets the type as a start/end vertex and then returns.

If at least one edge is above the horizontal line, block 604 goes to block 606 which determines whether both edges are above the horizontal line. If so, block 606 goes to block 610 which sets the type of the vertex as an end/join type and then returns to FIG. 2.

If both edges are not above the horizontal line, block 606 goes to block 608 since at least one edge is above the horizontal line and one edge is below the horizontal line, block 608 sets the vertex type as a continue type and then returns to FIG. 2.

If one of the edges connected to the vertex is on a horizontal line, block 602 goes to block 614 which searches the active trapezoid list to determine the relationship of the vertex to the active trapezoids in the list.

Block 616 determines whether only one trapezoid was found that has an edge with the vertex at its end. If only a single trapezoid was found, block 616 transfers to block 608 to type this vertex as a continue type vertex. If no trapezoid was found having an edge with the vertex at its end, block 618 transfers to block 610 which sets the vertex type as a start/split vertex. If, however, more than one trapezoid in the active trapezoid list has this vertex at an end of one of its edges, block 618 transfers to block 612 which sets the type of the vertex as a end/join type.

Figure 7:
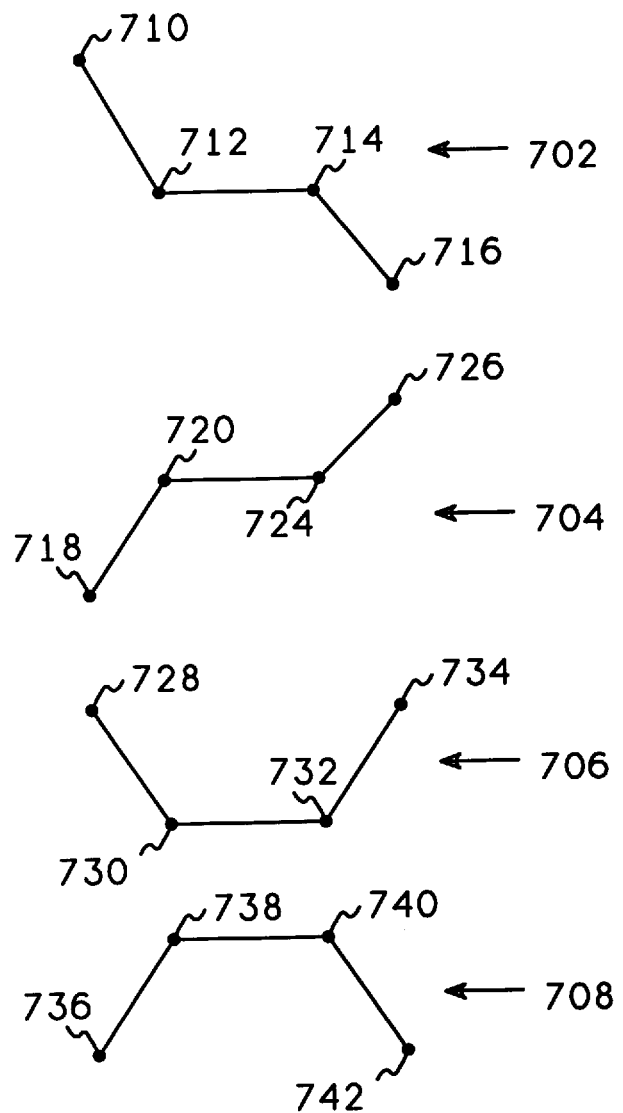
FIG. 7 shows four types of vertices, each having a horizontal line.

FIG. 7 shows the four types of vertices, each having a horizontal edge, that can exist with the processing of blocks 614, 616, and 618 described above. As shown above in the flowchart of FIG. 6, there are three rules that determine the classification of the vertex having a horizontal edge connected to it. The first rule is that the vertex will be a continue vertex if and only if there is one active edge in an active trapezoid within the active trapezoid list that has the vertex as an end vertex of that edge. The second rule is that the vertex will be considered a start/split vertex if there exists no edges in an active trapezoid that has the vertex as an end point. The third rule is that a vertex will be considered an end/join vertex if there is more than one, and in fact two, edges within active trapezoids that have this vertex as an end point.

FIG. 7 shows examples of the four types of vertices having horizontal edges connected to them. In example 702 there are two vertices that have a horizontal edge connected to them. Specifically, vertex 712 and vertex 714. Since vertices are processed in a top to bottom, left to right order, vertex 710 will already have been processed before vertex 712 is processed, therefore there will be one active trapezoid which has vertex 712 as an end of an edge within the active trapezoid. Therefore, vertex 712 satisfies the first rule and will be considered a continue vertex. For the same reason, there will be one trapezoid having vertex 714 as its end point, since vertex 712 will already have been processed before vertex 714 is processed. Therefore, vertex 714 will also be classified as a continue vertex under the first rule.

In example 704, vertices 720 and 724 have a horizontal edge connected to them. Because of the top to bottom, left to right processing order, no vertices connected to 720 will have been processed before vertex 720 is processed. That is, since vertex 718 is below vertex 720 it will be processed after vertex 720, and since vertex 724 is to the right of vertex 720 it will also be processed after vertex 720. Therefore, vertex 720 will be considered a start/split vertex satisfying rule two, since there will be no active trapezoids containing vertex 720 as an end point of an edge.

Vertex 724, however, will be considered an end/join vertex, because the trapezoid that was created when vertex 726 was processed will have vertex 724 as an end point, and the trapezoid that was created when vertex 720 was processed will also have vertex 724 as an end point. Therefore, there will be two trapezoids that have vertex 724 as an end point, and vertex 724 will be considered an end/join vertex under rule three.

In example 706, vertices 730 and 732 both have a horizontal edge connected to them. Vertex 730 will be classified as a continue vertex under rule one, since the trapezoid having the edge 728, 730 will be connected to it. Vertex 732 will be considered an end/join vertex under rule three, because vertex 730 and vertex 734 will have been processed before vertex 732, therefore there will be two trapezoids having vertex 732 as an end point of an edge within the trapezoids.

In example 708, vertices 738 and vertices 740 both have a horizontal edge connected to them. Vertex 738 will be processed prior to the processing of vertex 740 or 736, therefore vertex 738 will be classified as a start/split vertex under rule two because there will be no edges in the active trapezoid list with vertex 738 as an end point. Vertex 740, however, will be processed after vertex 738, so it will be considered a continue vertex under rule one because there will be one active edge in the trapezoid list with vertex 740 as an end point.

FIG. 8 shows a detailed flowchart of the method for processing a start/split vertex as called from FIG. 2. Referring now to FIG. 8, after entry, block 802 calls the process of FIG. 9 to find the left and right edges connected to the vertex, which is called CVERTEX. Block 804 then calls FIG. 11 to search the active trapezoid list for trapezoids having CVERTEX between the left and right edges of the trapezoids. Block 806 determines how many trapezoids were found wherein CVERTEX is between left and right edges. If none were found, block 806 transfers to block 808 to add a new trapezoid to the active trapezoid list. Block 808 sets the left edge vertex zero of the new trapezoid to CVERTEX and sets the left edge vertex one of the new trapezoid to the end point of the left edge that is connected to CVERTEX. Block 810 then sets the right edge vertex zero equal to CVERTEX and sets the right edge vertex one equal to the end point of the right hand edge that is connected to CVERTEX. Thus, the left and right edges that are connected to CVERTEX become the left and right edges of the trapezoid that is created. Block 812 then sets the start of this new trapezoid to CVERTEX before returning to FIG. 2. An example of the situation of blocks 808, 810 and 812 was seen above in FIG. 4 with respect to vertex 1.

If one trapezoid was found in the active trapezoid list that has CVERTEX between its left and right edges, block 806 goes to block 814 to split that trapezoid into two active trapezoids. Block 814 sets the end vertex of the trapezoid that was found in block 804 equal to CVERTEX, thus completing this trapezoid. Block 816 then determines whether the start/end vertices of the found trapezoid are both located on the same edge and if they are not, block 816 transfers to block 818 to mark the start and end vertices as a diagonal within the trapezoid. After marking the diagonal, or if the start/end vertices were on the same edge, control goes to block 820 which saves the found trapezoid edge vertices in a variable called OLDV. Block 822 then creates two new trapezoids in the list, called the left trapezoid and the right trapezoid. Block 824 initializes the left trapezoid by setting the left edge vertex zero of this trapezoid equal to the left edge vertex zero stored in the variable OLDV. It also sets the left edge vertex one equal to the end point of the left edge connected to CVERTEX, it sets the right edge vertex zero equal to CVERTEX, it sets the right edge vertex one equal to the end point of the left edge connected to CVERTEX, and it sets the start vertex for the new left trapezoid equal to CVERTEX.

Block 826 initializes the right trapezoid by setting the left edge vertex zero of the right trapezoid equal to the vertex zero of the right edge connected to CVERTEX. It sets the left edge vertex one equal to the end point of the right edge connected to CVERTEX, it sets the right edge vertex zero equal to CVERTEX, it sets the right edge vertex one equal to the end point of the right edge connected to CVERTEX, and it sets the start vertex of the right trapezoid equal to CVERTEX. Control then returns to FIG. 2.

If CVERTEX is between the left and right edges of more than one trapezoid, the polygon cannot be processed, probably because it has intersecting edges, so block 806 exits this procedure.

Figure 9:
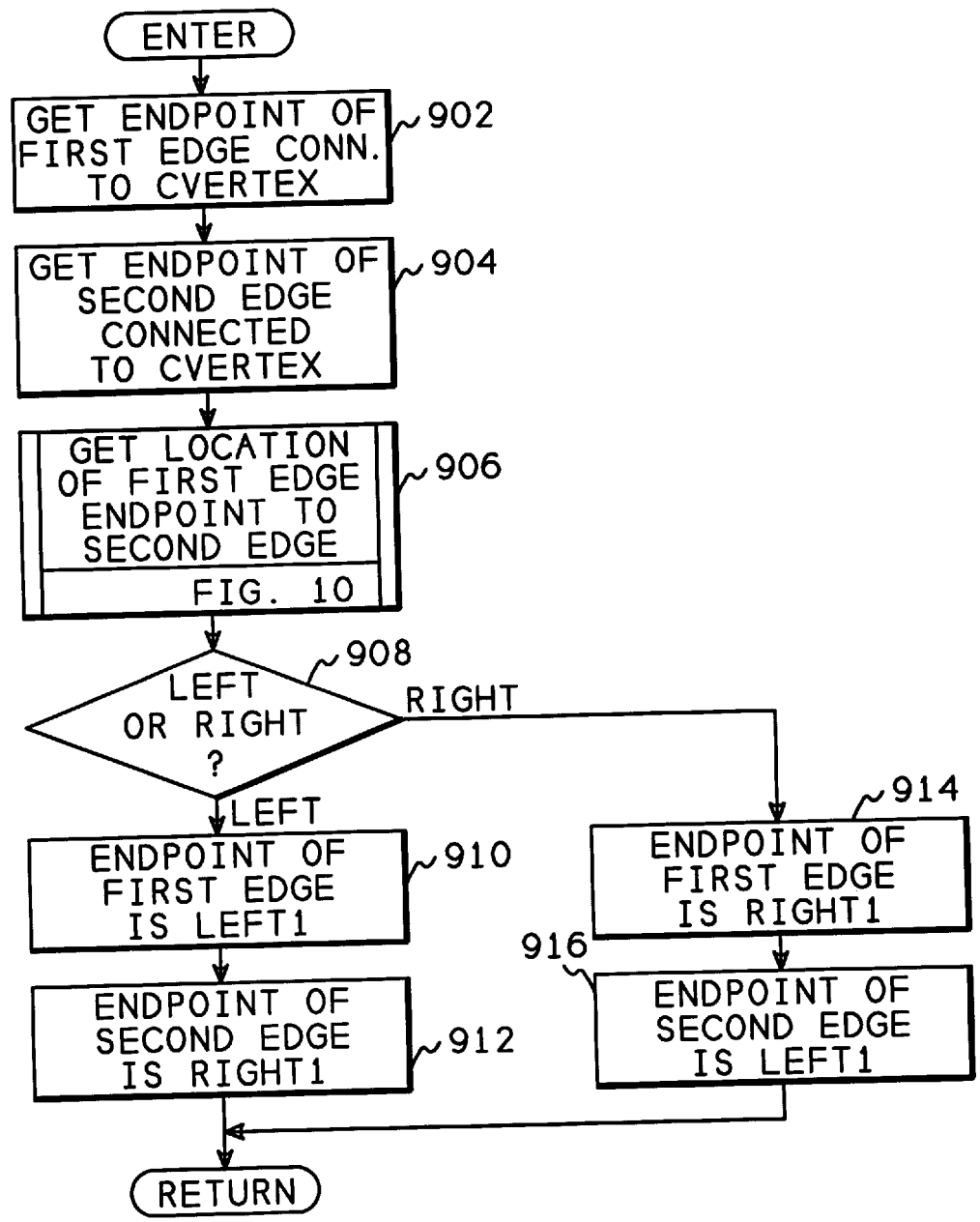
FIG. 9 shows a flowchart of the method for finding left and right edges called from FIG. 8.

FIG. 9 shows a flowchart of the method for finding left and right edges called from block 802 of FIG. 8. Referring now to FIG. 9, after entry, block 902 gets the end point of the first edge connected to CVERTEX and block 904 gets the end point of the second edge connected to CVERTEX. Block 906 then calls FIG. 10 to determine the location of the end point found in block 902, that is, the end point of the first edge connected to CVERTEX, relative to the second edge. This is the far end point of the first edge on the left or right side of the line formed by the second edge.

If the end point of the first edge is to the left of the second edge, block 908 transfers to block 910 which sets the end point of the first edge into the variable LEFT1 and then block 912 sets the end point of the second edge as the variable RIGHT1 before returning to FIG. 8. If the far end point of the first edge is to the right of the second edge, block 908 transfers to block 914 which sets the end point of the first edge as the variable RIGHT1 and sets the end point of the second edge as the variable LEFT1 before returning to FIG. 8.

Figure 10:
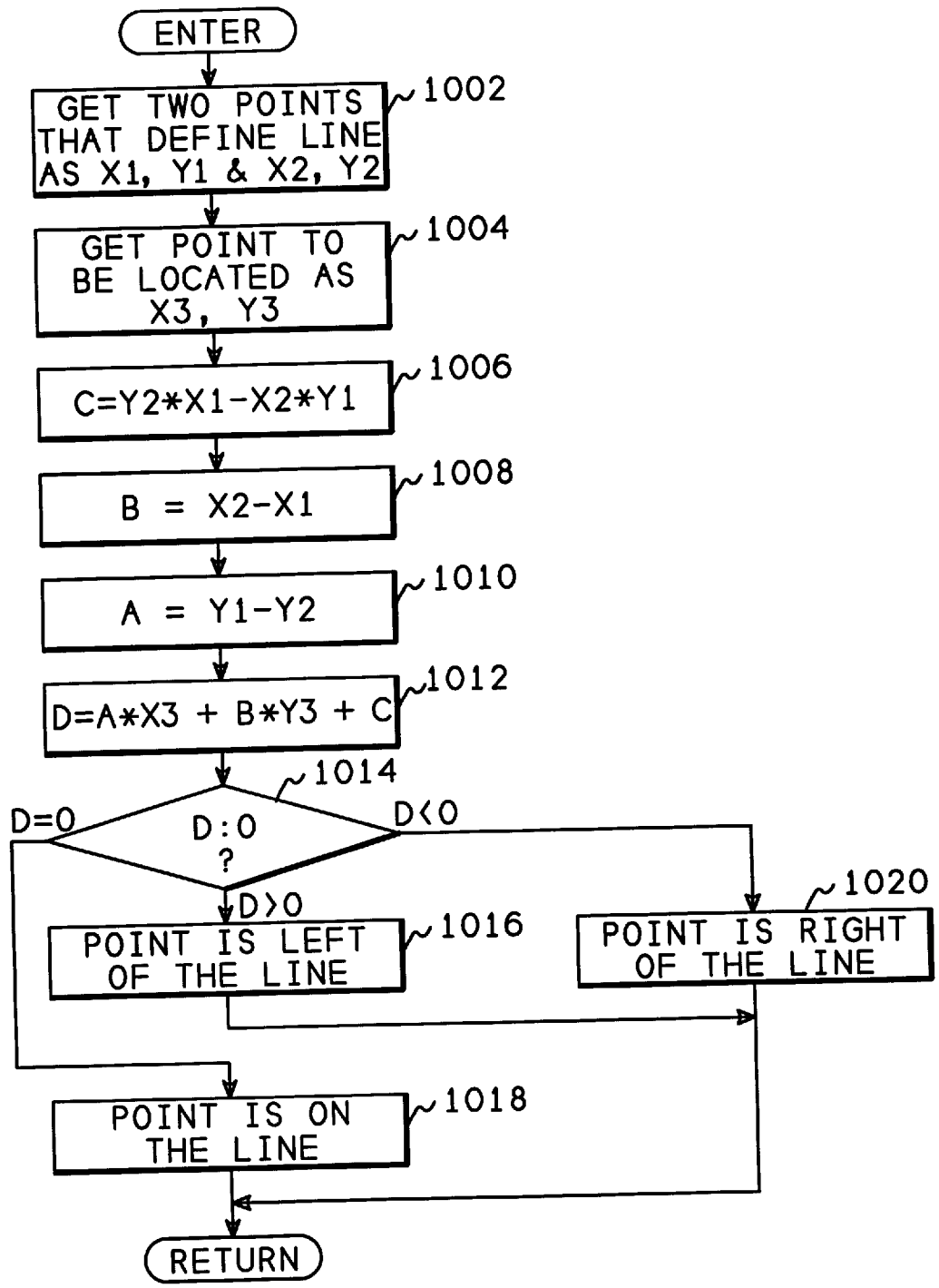
FIG. 10 shows a flowchart of the method for determining whether a point is to the left or right of a line, as called from FIG. 9.
Figure 11:
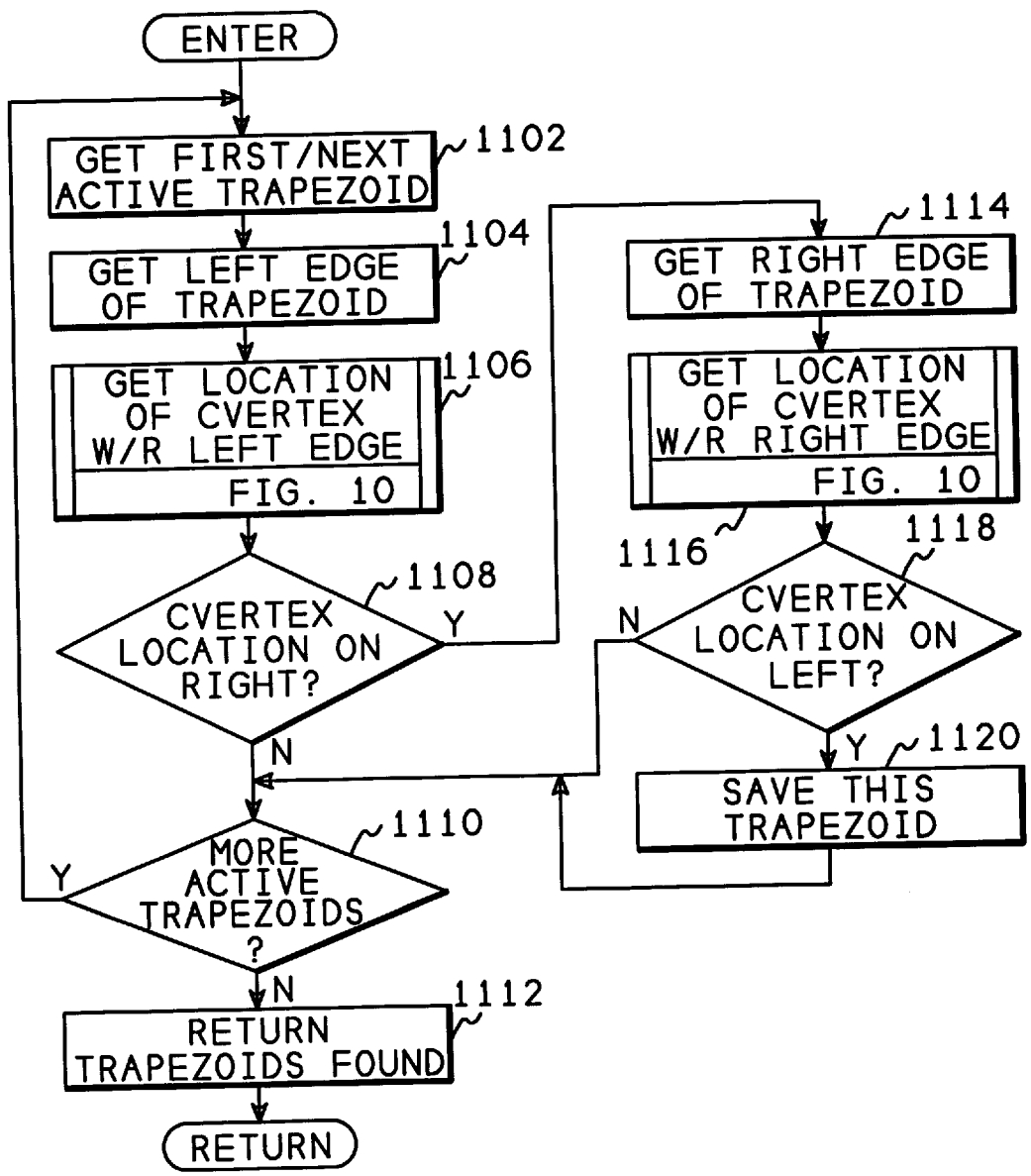
FIG. 11 shows a flowchart of the method of finding a trapezoid having the current vertex between its left and right edges.

FIG. 10 shows a flowchart of the method for determining whether a point is to the left or the right of a line, as called from FIG. 9 and FIG. 11. Referring now to FIG. 10, after entry, block 1002 gets the two points that define the line and sets their coordinates into the variables X1, Y1 and X2, Y2. Block 1004 gets the point to be located and sets its coordinates into the variables X3 and Y3. Block 1006 calculates the value of a variable C by subtracting the result of multiplying X2 by Y1 from the result of multiplying Y2 by X1. Block 1008 determines the value for a variable B by subtracting X1 from X2, and block 1010 calculates for a variable A by subtracting Y2 from Y1. Block 1012 then determines the value of a variable D by adding the result of A multiplied by X3, the result of B multiplied by Y3, and the variable C. Block 1014 then evaluates the variable D with respect to zero, and if D equals zero, block 1014 transfers to block 1018 since the point is located on the line. If D is less than zero, block 1014 transfers to block 1020 since the point is to the right of the line, and if D is greater than zero, block 1014 transfers to block 1016 since the point is left of the line.

FIG. 11 shows a flowchart of the method of finding a trapezoid having the current vertex between its left and right edges, as called from block 804 of FIG. 8. Referring now to FIG. 11, after entry, block 1102 gets the first or next active trapezoid from the trapezoid list. Block 1104 gets the left edge of the trapezoid and block 1106 calls FIG. 10 to get the location of CVERTEX with respect to the left edge retrieved in block 1104. If CVERTEX is not located to the right of the left edge, block 1108 transfers to block 1110 since CVERTEX cannot possibly be between the edges of this trapezoid. Block 1110 then determines if there are more active trapezoids and if there are, transfers back to block 1102 to get the next trapezoid. If there are no more active trapezoids, block 1110 transfers to block 1112 to return the trapezoids found in the search.

If CVERTEX is located to the right of the left edge of this trapezoid, block 1108 transfers to block 1114 which gets the right edge of the trapezoid and then block 1116 calls FIG. 10 again to determine whether CVERTEX is to the left of this right edge. If CVERTEX is not to the left of the right edge, block 1118 transfers to block 1110 since CVERTEX cannot be between the edges of this trapezoid. If, however, CVERTEX is to the left of the right edge of this trapezoid, block 1118 transfers to block 1120 which saves this trapezoid as a trapezoid wherein CVERTEX is located between its left and right edges and then transfers to block 1110 to continue processing the active trapezoids.

Figure 12:
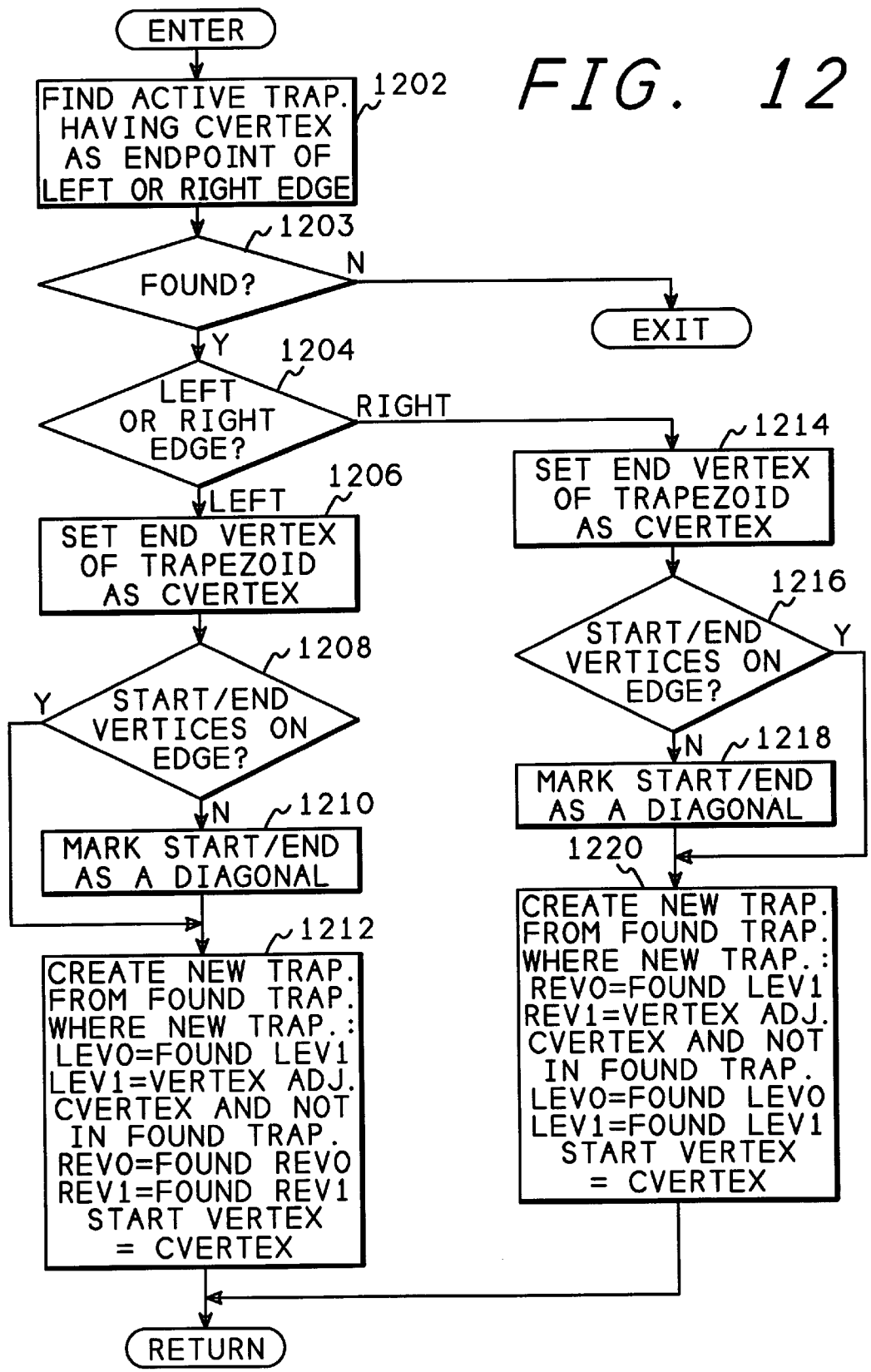
FIG. 12 shows a flowchart for processing continue vertices, as called from FIG. 2.

FIG. 12 shows a flowchart for processing continue vertices, as called from FIG. 2. Referring now to FIG. 12, after entry, block 1202 searches the trapezoid list to find an active trapezoid having the current vertex, CVERTEX, as an end point of a left or right edge of the active trapezoid. Block 1203 determines whether an active trapezoid was found and if not, exits this procedure since there is some form of error in the trapezoid or trapezoid list. That is, since a continue vertex has one edge above a horizontal line, and this edge must have an endpoint located above the continue vertex, there must be an active trapezoid with the continue vertex as an endpoint unless the polygon has intersecting edges. Therefore, if no trapezoid is found, the procedure exits.

If an active trapezoid was found, block 1203 goes to block 1204 which determines whether CVERTEX was located as an end point of the left or right edge. If CVERTEX was an end point of a left edge, block 1204 goes to block 1206 which sets the end vertex of the trapezoid as CVERTEX. Block 1208 then determines whether the start/end vertices are on the same edge, that is, whether a diagonal should be identified at this point, and if not, block 1208 goes to block 1210 which marks the start and end vertices of this active trapezoid as the start/end vertices of a diagonal. After marking the diagonal or if the start/end vertices of the trapezoid were on the same edge, control goes to block 1212 which creates a new trapezoid from the trapezoid found in block 1202. Block 1212 sets the left edge vertex zero to the found trapezoid's left edge vertex one; it sets the left edge vertex one to the vertex adjacent to CVERTEX that is not located within the found trapezoid; it sets the right edge vertex zero equal to the found trapezoid's right edge vertex zero; it sets the right edge vertex one equal to the found trapezoid's right edge vertex one; and it sets the start vertex equal to CVERTEX before returning to FIG. 2.

If CVERTEX was an end point of the right edge of the found trapezoid, block 1204 goes to block 1214 which sets the end vertex of the trapezoid to CVERTEX. Block 1216 and 1218 then determine whether a diagonal should be identified and if so, block 1218 marks the diagonal and control goes to block 1220. Block 1220 creates a new trapezoid from the found trapezoid by setting the right edge vertex zero of the new trapezoid equal to the found trapezoid's left edge vertex one; it sets the right edge vertex one of the new trapezoid to the vertex adjacent to CVERTEX that is not in the found trapezoid; it sets the left edge vertex zero of a new trapezoid equal to the left edge vertex zero of the trapezoid found in block 1202; it sets the left edge vertex one equal to the found trapezoid's left edge vertex one; and it sets the start vertex of the new trapezoid equal to CVERTEX before returning to FIG. 2.

Figure 13:
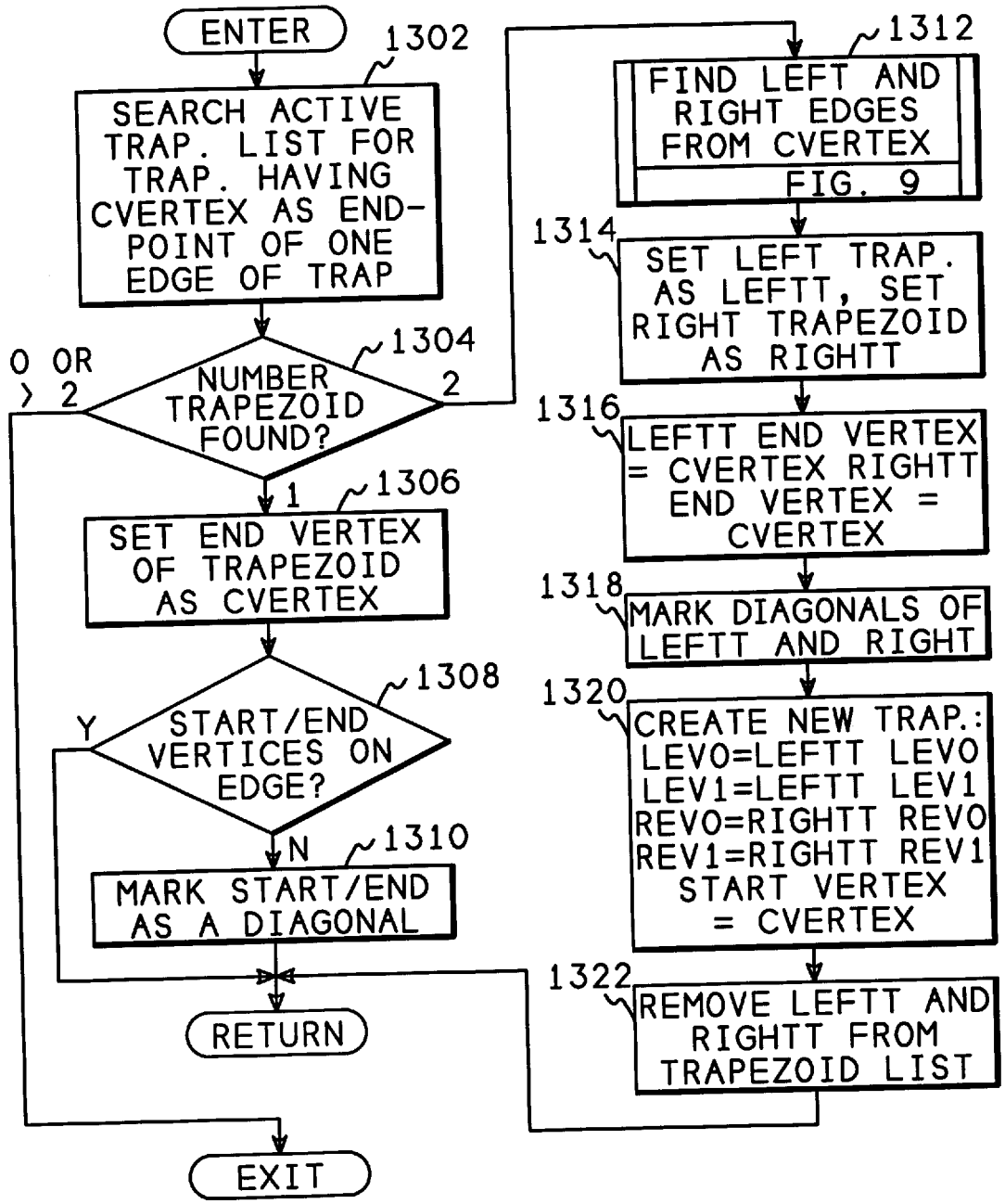
FIG. 13 shows a flowchart for processing end/join vertices, as called from FIG. 2.

FIG. 13 shows a flowchart for processing end/join vertices, as called from FIG. 2. Referring now to FIG. 13, after entry, block 1302 searches the active trapezoid list for a trapezoid having CVERTEX as an end point of one edge of an active trapezoid. Block 1304 determines the number of trapezoids found. If none were found, or more than two were found, block 1304 exits this procedure since there must be an error in the polygon.

If one trapezoid was found, then this vertex must be an end vertex so block 1304 transfers to block 1306. Block 1306 sets the end vertex of the found trapezoid to CVERTEX, then block 1308 determines whether a diagonal should be marked and if so, block 1310 marks the diagonal before returning to FIG. 2.

If exactly two trapezoids were found, block 1304 goes to block 1312 which calls FIG. 9 to find the left and right edges that are connected to CVERTEX. Block 1314 sets the left trapezoid found in block 1302 into a variable called LEFTT, and sets the right trapezoid found in block 1302 into a variable called RIGHTT. Block 1316 sets CVERTEX as the end vertex of LEFTT and as the end vertex of RIGHTT, and block 1318 marks diagonals from LEFTT and RIGHTT in the same manner as blocks 1308 and 1310. Block 1320 then creates a new trapezoid and assigns its left edge vertex zero to the left edge vertex zero of the LEFTT trapezoid, sets the left edge vertex one of the new trapezoid to the left edge vertex one of the LEFTT trapezoid, sets the right edge vertex zero of the new trapezoid equal to the right edge vertex zero of the RIGHTT trapezoid, sets the right edge vertex one of the new trapezoid equal to the right edge vertex one of the RIGHTT trapezoid, and sets the start vertex of the new trapezoid equal to CVERTEX. Block 1322 then removes the LEFTT and RIGHTT trapezoids from the trapezoid list, thus completing the join operation, before returning to FIG. 2.

Figure 14:
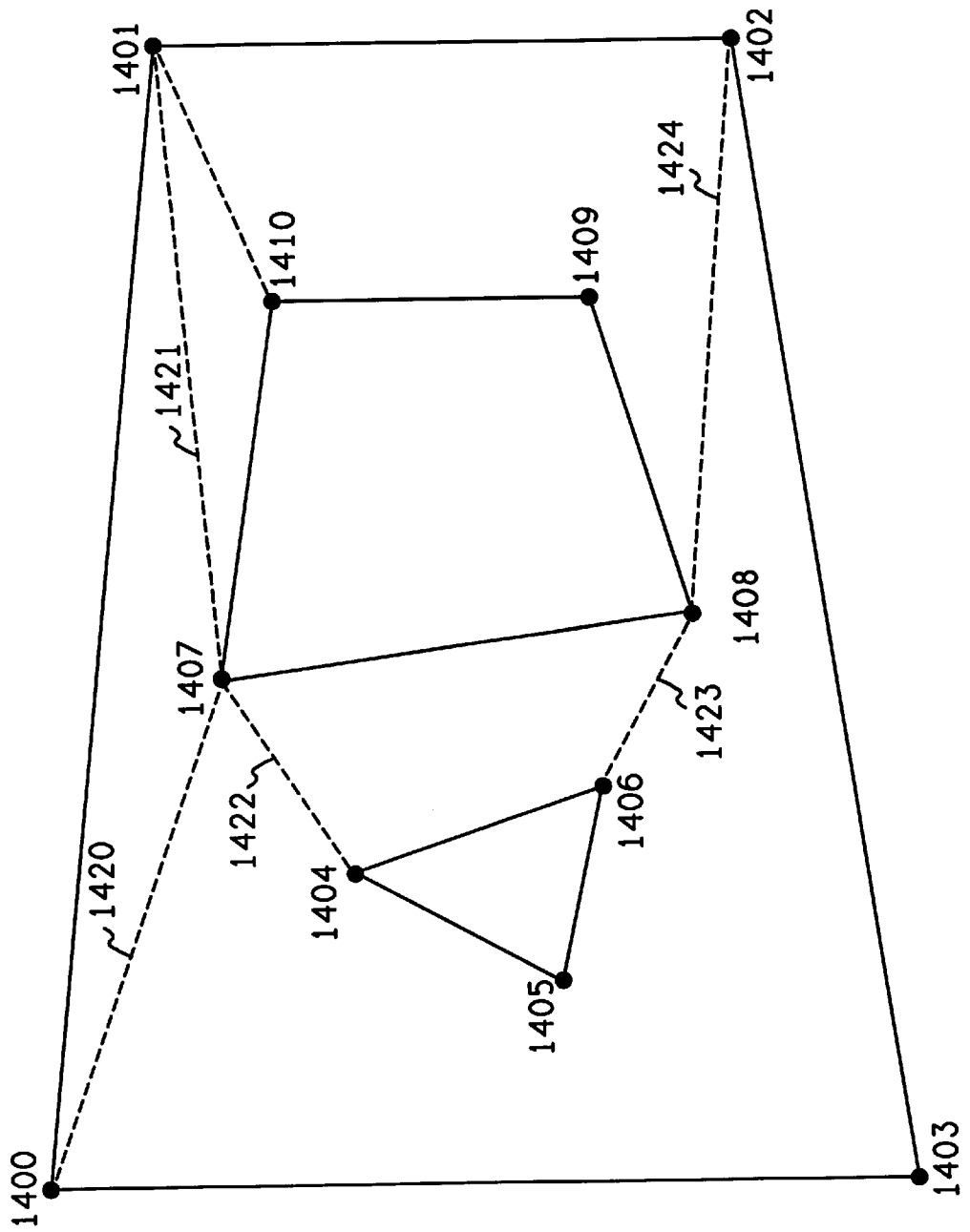
FIG. 14 shows an example of a polygon with holes.

The above process would be complete for the polygon if there are no polygons defined inside the original polygon. That is, a polygon can be defined as being completely contained within an outside polygon, thus it represents a hole in the outside polygon. When this situation occurs, additional processing is needed to "remove" the holes from the polygon. An example of a polygon containing holes is shown in FIG. 14, wherein the polygon comprising the points 1400, 1401, 1402, and 1403 contains two inner polygons that represent holes. The first of these inner polygons is a triangle comprising the vertices 1404, 1405, and 1406. The second hole is a quadrilateral shape comprising vertices 1407, 1408, 1409, and 1410. Diagonals 1420, 1421, 1422, 1423, and 1424 are formed using the above described process.

Figure 15:
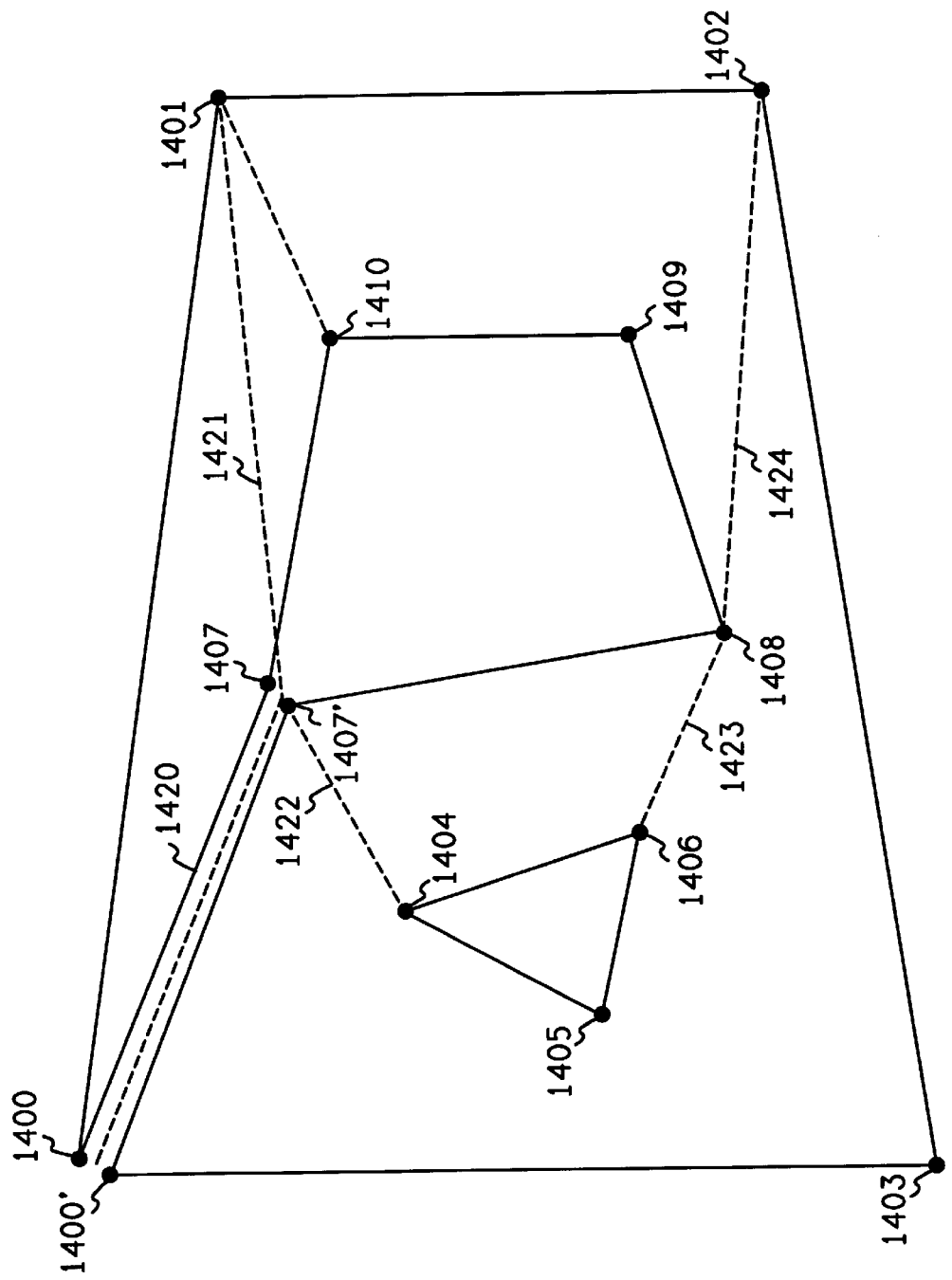
FIG. 15 shows the example of FIG. 16 with one hole removed and the diagonals reconnected.
Figure 16:
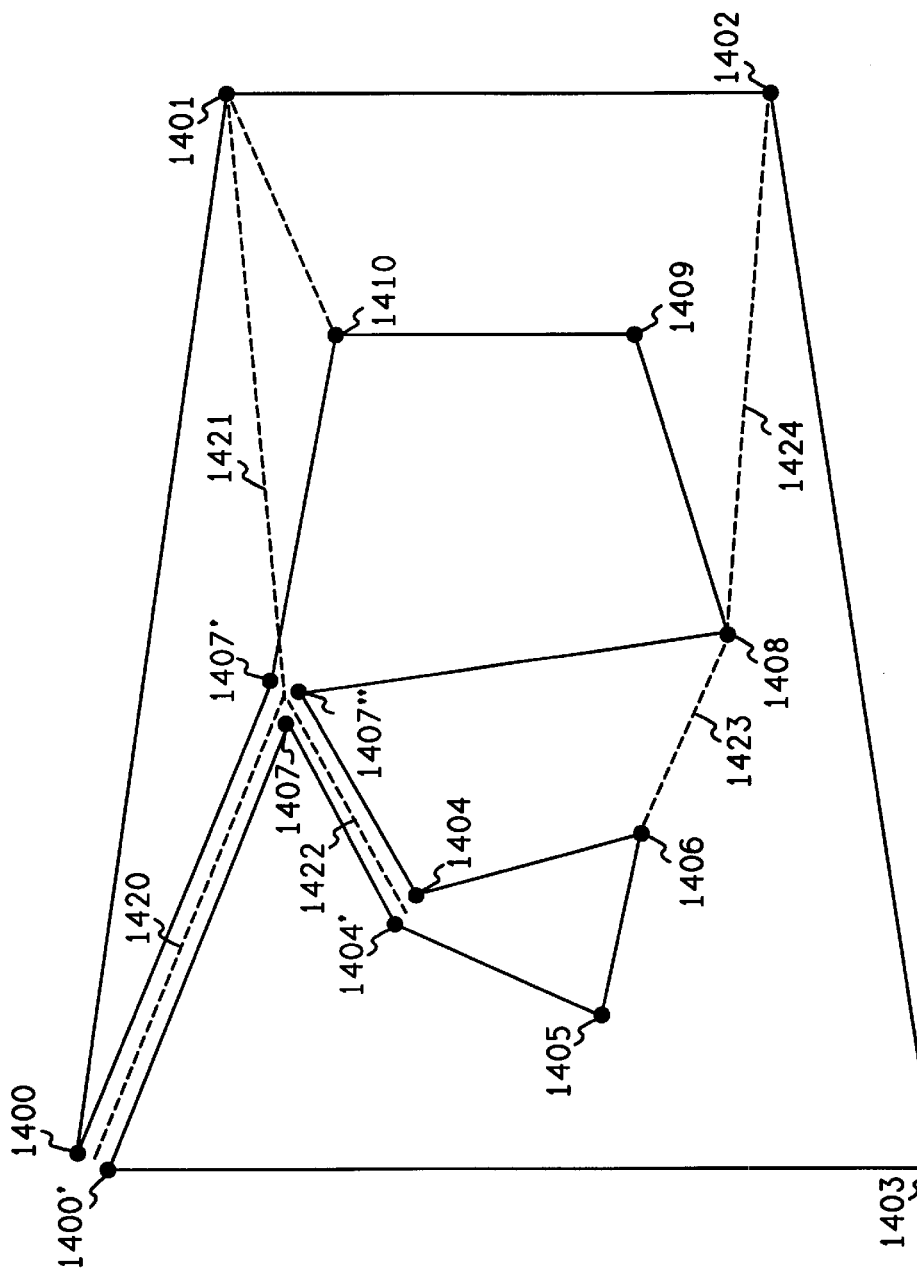
FIG. 16 shows the example of FIG. 16 with both holes removed.

To remove these holes, diagonal 1420 will be slit to form two edges of the polygon, thus removing the quadrilateral hole, and diagonal 1422 will also be slit to form two edges of the polygon, thus removing the triangle from the polygon. FIG. 15 shows the diagonal 1420 having been slit, to remove the quadrilateral shape, and FIG. 16 shows the diagonal 1422 having been slit to remove the triangle shape from the polygon. Although the slit diagonals are shown having space therebetween, this is done to illustrate the slit operation and in fact, the two diagonals formed from each slitting operation will occupy the same location. The process of performing these slit operations will be described below with respect to FIGS. 17 and 18.

Figure 17:
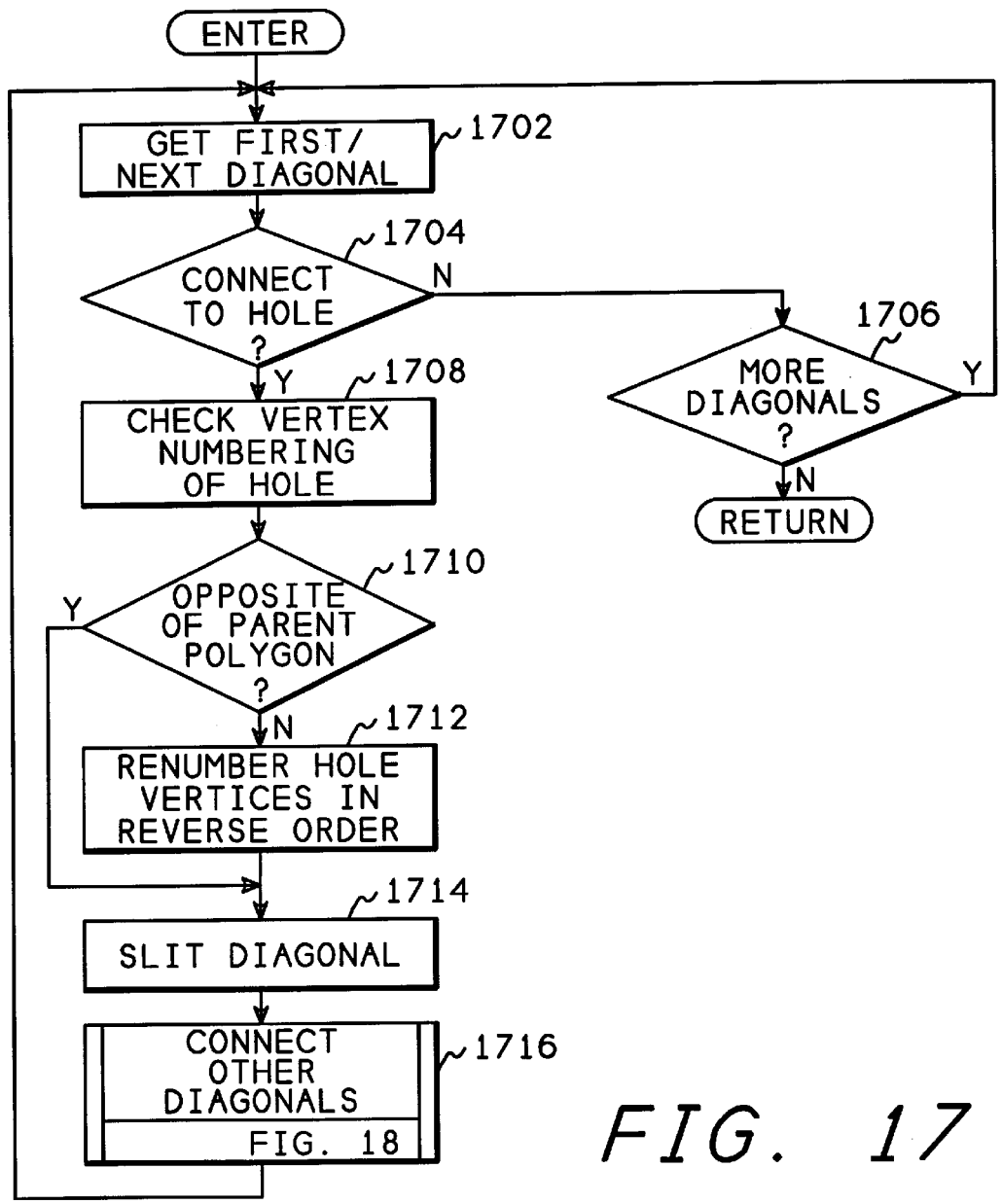
FIG. 17 shows a flowchart for removing holes within polygons.

FIG. 17 shows a flowchart for removing holes within polygons, as called from FIG. 3. Referring now to FIG. 17, after entry, block 1702 gets the first or next diagonal and block 1704 determines whether this diagonal connects the outside of the polygon to a hole. If not, block 1704 transfers to block 1706 which determines whether there are more diagonals and if there are, returns to block 1702 to process the next diagonal.

If this diagonal is connected to a hole, block 1704 goes to block 1708 which checks the vertex numbering of the hole. For this process to work correctly, the vertices within a hole must be numbered in the opposite direction to vertices on the outside of the polygon. For example, if the numbers on the outside of the polygon are numbered in clockwise order, the numbers for the holes must be numbered in counter clockwise order. The vertex ordering is determined by finding a vertex on the convex hull of the polygon, that is, the vertex from which the diagonal originates, and then taking the two dimensional cross product of the edge going into this vertex and the edge going from this vertex. This cross product will be either positive, negative, or zero. It will only be zero when the two edges are on a horizontal line. Then the cross product is formed with the vertex that is on the edge of the hole and these two cross products are compared. If the cross products have values with different signs, then the ordering of the two polygons is in opposite directions. If the signs are the same, the vertices of the two polygons are ordered in the same direction.

Block 1710 determines if the hole ordering is opposite of the parent polygon and if not, transfers to block 1712 which renumbers the vertices within the hole in the reverse order to make sure that they are the opposite of the parent. Block 1714 then slits the diagonal, for example, as shown above with respect to diagonal 1420 of FIG. 15. In performing this slit, two new edges are formed, one having the original vertices, and one having duplicate vertices, vertices 1400' and 1407' in this example. The two new vertices and the new edge will have the same location as the old vertices and edge, however, the edges coming into them will be connected differently. For example, as shown above with respect to FIG. 15, the edge 1400 to 1401 will remain connected to the original vertex 1400, whereas the original edge 1400 to 1403 will be connected to the new vertex 1400'. The edges of the inner polygon will be connected similarly to the vertices 1407 and 1407'.

Figure 18:
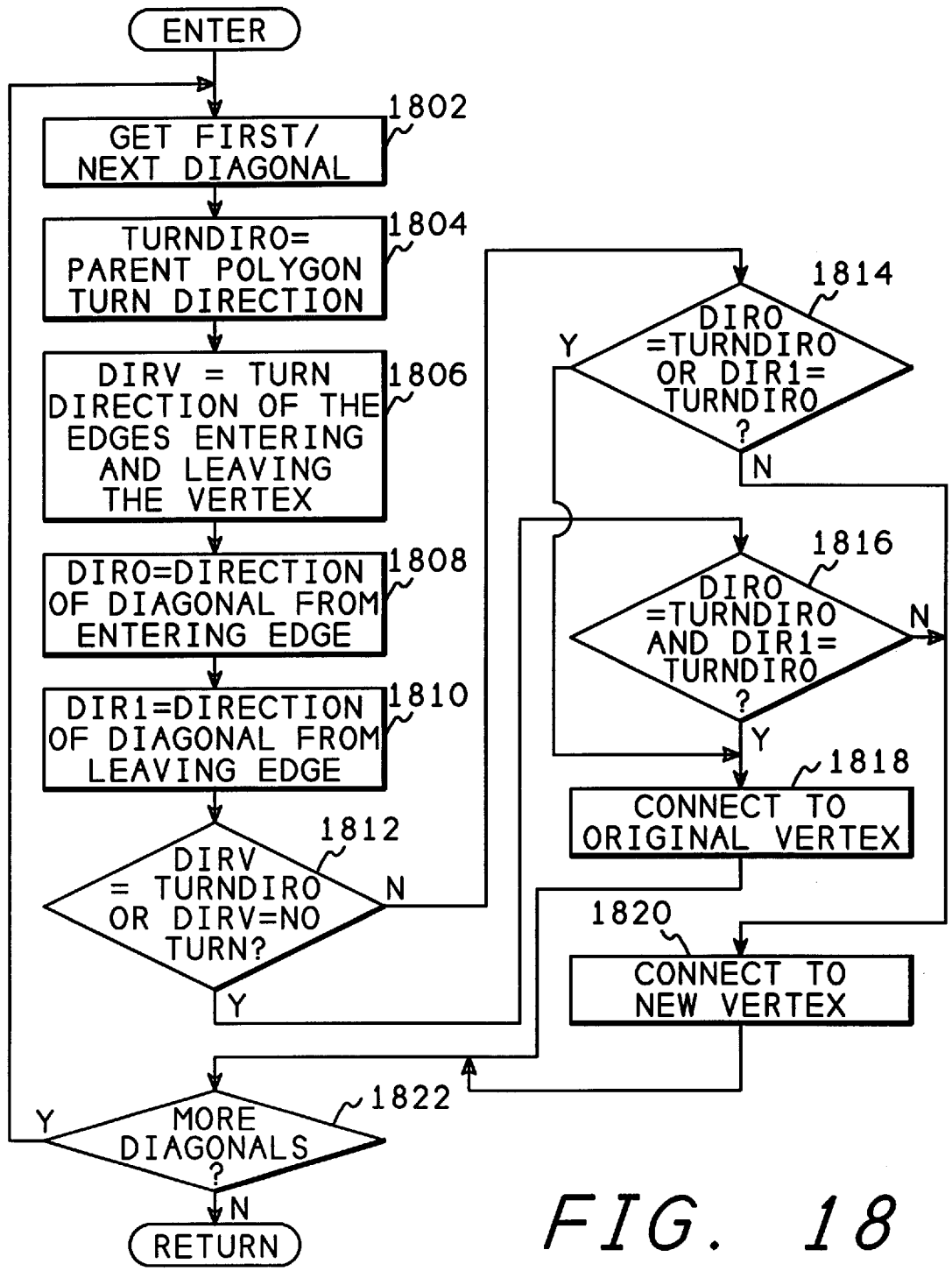
FIG. 18 shows a flowchart for reconnecting diagonals after a hole is removed.

After slitting the diagonal, block 1714 goes to block 1716 which calls FIG. 18 to connect the other diagonals to these vertices. For example, in FIG. 15 diagonal 1422 must be reconnected to vertex 1407' in order to have the hole actually removed from the polygon. Should diagonal 1422 remain connected to vertex 1407, the polygon would be intersecting and thus not processable by this method.

After connecting the other diagonals control returns to block 1702 to get the next diagonal and the process continues until all diagonals have been processed, at which time block 1706 returns to FIG. 3.

FIG. 18 shows the process of connecting the other diagonals to the newly formed vertices after a slit operation. Referring now to FIG. 18, after entry, block 1802 gets the first or next diagonal connected to the vertex. Block 1804 then sets the value of a variable TURNDIR0 equal to the TURNDIR (turn direction) of the parent polygon, that is, right for a clockwise turn direction or left for a counter clockwise turn direction. Block 1806 then sets the value of a variable DIRV equal to the turn direction of the edges entering and leaving the vertex. For example, for vertex 1407 of FIG. 15, the edge 1410 to 1407 and then edge 1407 to 1400 make a right turn as the edges enter and leave the vertex. Therefore, in this example DIRV would be equal to right.

Block 1808 then sets the value of a variable DIR0 equal to the direction of the diagonal from the entering edge. In the example of FIG. 15, the entering edge would be edge 1410–1407, and the diagonal 1422 would be left of this edge, therefore, DIR0 would be set to left.

Block 1810 then sets the value of a variable DIR1 equal to the direction of the diagonal from the leaving edge. In the example of FIG. 15, the leaving edge is edge 1407–1400, therefore diagonal 1422 is left of this edge, and DIR1 would be set to left.

Block 1812 then determines whether DIRV is equal to TURNDIR0 or whether DIRV is equal to a value of NOTURN. A value of NOTURN would occur where the two edges do not turn either left or right as they enter and leave the vertex. If neither of these cases is true, block 1812 goes to block 1814 which determines whether DIR0 is equal to TURNDIR0 or whether DIR1 is equal to TURNDIR0. If neither of these cases is true, block 1814 transfers to block 1820 which connects the diagonal to the new vertex. This is the case with the example of vertex 1407 and diagonal 1422 in FIG. 15.

If either DIRV is equal to TURNDIR0 or DIRV equals NOTURN, block 1812 transfers to block 1816 which determines whether DIR0 equals TURNDIR0 and DIR1 equals TURNDIR0. If both these conditions are true, block 1816 transfers to block 1818 which connects the diagonal to the original vertex. This would be the case in the example of FIG. 15 with diagonal 1421 and vertex 1407. After processing the diagonal, control goes to block 1822 which determines whether there are more diagonals entering this vertex and if so, transfers back to block 1802 to process the next diagonal entering this vertex. After all diagonals have been processed, block 1822 returns to FIG. 17.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A computer implemented method for decomposing a polygon into a plurality of trapezoids, said method comprising the steps of:
   (a) sorting all vertices of the polygon into a predetermined order to produce a sorted list of vertices;
   (b) processing each vertex of the sorted list of vertices comprising the steps of
      (b1) selecting a next vertex from the sorted list as a selected vertex,
      (b2) when neither edge connected to the selected vertex is horizontal, classifying the vertex as a start/split, continue, or end/join vertex by the location of the edges connected to the vertex,
      (b3) when at least one edge connected to the selected vertex is horizonal, classifying the vertex as a start/end, continue, or end/join vertex by examining trapezoids previously formed,
      (b4) using each start/split vertex to form a new trapezoid, or split an existing trapezoid to form a pair of trapezoids,
      (b5) using each continue vertex to complete an existing trapezoid and form a new trapezoid, and
      (b6) using each end/join vertex to complete formation of a trapezoid or combine a pair of trapezoids to form a single trapezoid; and
   (c) Displaying each of said trapezoids formed in step (b) on a display device.

2. The method of claim 1 wherein step (b3) further comprises the following steps:
   (b3a) when a single active trapezoid is found that has the vertex on a single edge of the active trapezoid, classifying the vertex as a continue vertex;
   (b3b) when no active trapezoid is found that has the vertex on an edge, classifying the vertex as a start/split vertex; and
   (b3c) when one or more active trapezoids are found wherein the vertex is an endpoint of an edge within the one or more active trapezoids, classifying the vertex as an end/join vertex.

3. The method of claim 1 further comprising the following step (c0) performed before step (c):
   (c0) examining each completed trapezoid, and when a start and end vertex of the trapezoid are located on different edges of the trapezoid, forming a diagonal line between the start and end vertices.

4. The method of claim 3 further comprising the following step (c0a) performed after step (c0) and before step (c):
   (c0a) when an inner polygon is formed within the polygon, removing the inner polygon by slitting a diagonal between a vertex on the polygon and a vertex on the inner polygon.

5. The method of claim 4 wherein step (d) further comprises the following step performed prior to the slitting of step (c0a):
   (c0a1) reversing an order of vertex numbers of the inner polygon, when vertices of the inner polygon are numbered in the same order as vertices of the polygon.

6. method of claim 4 wherein step (c0a) further comprises the steps of:
   (c0a1) determining a right or left turn direction of the polygon;
   (c0a2) determining a right or left turn direction of vectors leading into and out of the vertex on the inner polygon; and
   (c0a3) for each diagonal connected to the vertex on the inner polygon
      (c0a3a) determining a right or left location of the distal vertex of the diagonal to each of the vectors leading into and out of the vertex on the inner polygon,
      (c0a3b) when the turn direction determined in step (c0a1) is the same as the turn direction determined in step (c0a2), and both locations determined in step (c0a3a) match the turn direction determined in step (c0a1), connecting the diagonal to the original vertex, otherwise connecting the diagonal to the duplicate vertex, and
      (c0a3c) when the turn direction determined in step (c0a1) is different from the turn direction determined in step (c0a2), and either location determined in step (c0a3a) matches the turn direction determined in step (c0a1), connecting the diagonal to the original vertex, otherwise connecting the diagonal to the duplicate vertex.

7. The method of claim 1 wherein step (b4) further comprises the steps of:
   (b4a) examining each active trapezoid to determine if the start/split vertex is located between edges of an active trapezoid; and
   (b4b) when the start/split vertex is located between the edges of more than one active trapezoid found in step (b4a), discontinuing the method.

8. The method of claim 1 wherein step (b5) further comprises the steps of:
  (b5a) examining each active trapezoid to determine if the continue vertex is located as an endpoint of a left or right edge of an active trapezoid; and
  (b5b) when no active trapezoid is found in step (b5a), discontinuing the method.

9. The method of claim 1 wherein step (b6) further comprises the steps of:
  (b6a) examining each active trapezoid to determine a number of active trapezoids that contain the end/join vertex as an endpoint of an edge of an active trapezoid; and
  (b6b) when no active trapezoid is found in step (b6a), discontinuing the method.

10. The method of claim 9 further comprising the step of:
  (b6c) when more than two active trapezoids are found in step (b6a), discontinuing the method.

11. A computer implemented method for decomposing a polygon into a plurality of trapezoids, said method comprising the steps of:
  (a) sorting all vertices of the polygon into a predetermined order to produce a sorted list of vertices;
  (b) processing each vertex of the sorted list of vertices comprising the steps of
    (b1) selecting a next vertex from the sorted list as a selected vertex,
    (b2) classifying the vertex as a start/split, continue, or end/join vertex by the location of the edges connected to the vertex,
    (b3) using each start/split vertex to form a new trapezoid, or split an existing trapezoid into a pair of trapezoids,
    (b4) using each continue vertex to complete an existing trapezoid and start a new trapezoid, and
    (b5) using each end/join vertex to complete a trapezoid or combine a pair of trapezoids;
  (c) examining each completed trapezoid, and when a start and end vertex of the trapezoid are located on different edges of the trapezoid, forming a diagonal line between the start and end vertices;
  (d) when an inner polygon is formed within the polygon, removing the inner polygon, comprising the steps of
    (d1) slitting a diagonal between a vertex on the polygon and a vertex on the inner polygon,
    (d2) determining a right or left turn direction of the polygon,
    (d3) determining a right or left turn direction of vectors leading into and out of the vertex on the inner polygon, and
    (d4) for each diagonal connected to the vertex on the inner polygon
      (d4a) determining a right or left location of the distal vertex of the diagonal relative to each of the vectors leading into and out of the vertex on the inner polygon,
      (d4b) when the turn direction determined in step (d2) is the same as the turn direction determined in step (d3), and both locations determined in step (d4a) match the turn direction determined in step (d2), connecting the diagonal to the original vertex, otherwise connecting the diagonal to the duplicate vertex, and
      (d4c) when the turn direction determined in step (d2) is different from the turn direction determined in step (d3), and either location determined in step (d4a) matches the turn direction determined in step (d2), connecting the diagonal to the original vertex, otherwise connecting the diagonal to the duplicate vertex; and
  (e) Displaying each of said trapezoids formed in steps (b), (c) and (d) on a display device.

12. The method of claim 11 wherein step (b3) further comprises the steps of:
  (b3a) when neither edge connected to the selected vertex is horizontal, classifying the vertex as a start/split, continue, or end/join vertex by the location of the edges connected to the vertex; and
  (b3b) when at least one edge connected to the selected vertex is horizonal, classifying the vertex as a start/end, continue, or end/join vertex by examining trapezoids previously formed.

13. The method of claim 12 wherein step (b3b) further comprises the following steps:
  (b3b1) when a single active trapezoid is found that has the vertex on a single edge of the active trapezoid, classifying the vertex as a continue vertex;
  (b3b2) when no active trapezoid is found that has the vertex on an edge, classifying the vertex as a start/split vertex; and
  (b3b3) when one or more active trapezoids are found wherein the vertex is an endpoint of an edge within the one or more active trapezoids, classifying the vertex as an end/join vertex.

14. The method of claim 11 wherein step (d) further comprises the following step performed prior to the slitting of step (d1):
  (d0) reversing an order of vertex numbers of the inner polygon, when vertices of the inner polygon are numbered in the same order as vertices of the polygon.

15. The method of claim 11 wherein step (b3) further comprises the steps of:
  (b3a) examining each active trapezoid to determine if the start/split vertex is located between edges of an active trapezoid; and
  (b3b) when the start/split vertex is located between the edges of more than one active trapezoid found in step (b4a), discontinuing the method.

16. The method of claim 11 wherein step (b4) further comprises the steps of:
  (b4a) examining each active trapezoid to determine if the continue vertex is located as an endpoint of a left or right edge of an active trapezoid; and
  (b4b) when no trapezoid is found in step (b5a), discontinuing the method.

17. The method of claim 11 wherein step (b5) further comprises the steps of:
  (b5a) examining each active trapezoid to determine a number of active trapezoids that contain the end/join vertex as an endpoint of an edge of an active trapezoid; and
  (b5b) when no active trapezoid is found in step (b6a), discontinuing the method.

18. The method of claim 17 further comprising the step of:
  (b5c) when more than two active trapezoids are found in step (b6a), discontinuing the method.

19. A computer implemented method for decomposing a polygon into a plurality of trapezoids, said method comprising the steps of:
  (a) sorting all vertices of the polygon into a predetermined order to produce a sorted list of vertices;

(b) processing each vertex of the sorted list of vertices comprising the steps of
(b1) selecting a next vertex from the sorted list as a selected vertex,
(b2) when neither edge connected to the selected vertex is horizontal, classifying the vertex as a start/split, continue, or end/join vertex by the location of the edges connected to the vertex,
(b3) when at least one edge connected to the selected vertex is horizonal, classifying the vertex as a start/end, continue, or end/join vertex by examining trapezoids previously formed, comprising the steps of
(b3a) when a single active trapezoid is found that has the vertex on a single edge of the active trapezoid, classifying the vertex as a continue vertex,
(b3b) when no active trapezoid is found that has the vertex on an edge, classifying the vertex as a start/split vertex, and
(b3c) when one or more active trapezoids are found wherein the vertex is an endpoint of an edge within the one or more active trapezoids, classifying the vertex as an end/join vertex,
(b4) using each start/split vertex to form a new trapezoid, or split an existing trapezoid to form a pair of trapezoids,
(b5) using each continue vertex to complete an existing trapezoid and form a new trapezoid, and
(b6) using each end/join vertex to complete formation of a trapezoid or combine a pair of trapezoids into a single trapezoid;
(c) examining each completed trapezoid, and when a start and end vertex of the trapezoid are located on different edges of the trapezoid, forming a diagonal line between the start and end vertices;
(d) when an inner polygon is formed within the polygon, removing the inner polygon, comprising the steps of
(d1) slitting a diagonal line between a vertex on the polygon and a vertex on the inner polygon,
(d2) determining a right or left turn direction of the polygon,
(d3) determining a right or left turn direction of vectors leading into and out of the vertex on the inner polygon, and
(d4) for each diagonal connected to the vertex on the inner polygon
(d4a) determining a right or left location of the distal vertex of the diagonal relative to each of the vectors leading into and out of the vertex on the inner polygon,
(d4b) when the turn direction determined in step (d2) is the same as the turn direction determined in step (d3), and both locations determined in step (d4a) match the turn direction determined in step (d2), connecting the diagonal to the original vertex, otherwise connecting the diagonal to the duplicate vertex, and
(d4c) when the turn direction determined in step (d2) is different from the turn direction determined in step (d3), and either location determined in step (d4a) matches the turn direction determined in step (d2), connecting the diagonal to the original vertex, otherwise connecting the diagonal to the duplicate vertex; and
(e) Displaying each of said trapezoids formed in steps (b), (c) and (d) on a display device.

20. The method of claim 19 wherein step (d) further comprises the following step performed prior to the slitting of step (d1):
(d0) reversing an order of vertex numbers of the inner polygon, when vertices of the inner polygon are numbered in the same order as vertices of the polygon.

21. The method of claim 19 wherein step (b4) further comprises the steps of:
(b4a) examining each active trapezoid to determine if the start/split vertex is located between edges of an active trapezoid; and
(b4b) when the start/split vertex is located between the edges of more than one active trapezoid found in step (b4a), discontinuing the method.

22. The method of claim 19 wherein step (b5) further comprises the steps of:
(b5a) examining each active trapezoid to determine if the continue vertex is located as an endpoint of a left or right edge of an active trapezoid; and
(b5b) when no active trapezoid is found in step (b5a), discontinuing the method.

23. The method of claim 19 wherein step (b6) further comprises the steps of:
(b6a) examining each active trapezoid to determine a number of previously formed active trapezoids that contain the end/join vertex as an endpoint of an edge of an active trapezoid;
(b6b) when no active trapezoid is found in step (b6a), discontinuing the method; and
(b6c) when more than two active trapezoids are found in step (b6a), discontinuing the method.

* * * * *